US012798781B2

(12) United States Patent
Kawai

(10) Patent No.: US 12,798,781 B2
(45) Date of Patent: Nov. 17, 2026

(54) BLENDED WING BODY AIRCRAFT WITH A COMBUSTION ENGINE AND METHOD OF USE

(71) Applicant: JetZero, Inc., Long Beach, CA (US)

(72) Inventor: Ronald Tatsuji Kawai, Rancho Palos Verdes, CA (US)

(73) Assignee: JetZero, Inc., Long Beach, CA (US)

( * ) Notice: Subject to any disclaimer, the term of this patent is extended or adjusted under 35 U.S.C. 154(b) by 0 days.

(21) Appl. No.: 18/397,011

(22) Filed: Dec. 27, 2023

(65) Prior Publication Data

US 2024/0132220 A1 Apr. 25, 2024

Related U.S. Application Data

(63) Continuation-in-part of application No. 17/731,622, filed on Apr. 28, 2022, now Pat. No. 11,891,178.

(51) Int. Cl.

| | |
|---|---|
| ***B64D 27/10*** | (2006.01) |
| ***B64C 39/10*** | (2006.01) |
| ***B64D 37/06*** | (2006.01) |
| ***B64D 41/00*** | (2006.01) |
| ***H01M 8/04082*** | (2016.01) |

(52) U.S. Cl.
CPC .............. *B64D 27/10* (2013.01); *B64C 39/10* (2013.01); *B64D 37/06* (2013.01); *B64D 41/00* (2013.01); *H01M 8/04201* (2013.01); *B64C 2039/105* (2013.01); *B64D 2041/005* (2013.01); *H01M 2250/20* (2013.01)

(58) Field of Classification Search
CPC ............ B64C 39/105; B64C 2039/105; B64D 37/30; B64D 41/00; B64D 2041/002; B64D 2041/005; B64D 37/02; B64D 37/04; B60K 15/03; B60K 15/006; B60K 15/063
See application file for complete search history.

(56) References Cited

U.S. PATENT DOCUMENTS

| | | | |
|---|---|---|---|
| 2,967,034 | A | 1/1961 | Donald |
| 3,261,571 | A | 7/1966 | Pinnes |
| 3,955,784 | A | 5/1976 | Salkeld |
| 3,979,005 | A | 9/1976 | Robinson et al. |

(Continued)

FOREIGN PATENT DOCUMENTS

| | | | |
|---|---|---|---|
| CN | 207631504 | U | 7/2018 |
| CN | 112407299 | A | 2/2021 |

OTHER PUBLICATIONS

Dries Verstraete, Kai; Lehmkuehler, K.C. Wong; Design of a Fuel Cell; Design of a Fuel Cell Powered Blended Wing Body UAV, Dec. 2012.

(Continued)

*Primary Examiner* — Philip J Bonzell
(74) *Attorney, Agent, or Firm* — Jeffrey Schox

(57) ABSTRACT

A system for a blended wing body aircraft with a combustion engine is illustrated. The aircraft comprises a blended wing body, at least a fuel source located within the blended wing body and configured to store a fuel, wherein the fuel includes liquid hydrogen, and at least a propulsor configured to propel the blended wing body aircraft. The at least a propulsor comprises a combustion engine configured to burn the fuel from the fuel source and produce mechanical work to power the at least a propulsor.

13 Claims, 15 Drawing Sheets

(56) References Cited

U.S. PATENT DOCUMENTS

| | | | | |
|---|---|---|---|---|
| 4,946,056 | A | 8/1990 | Stannard | |
| 6,123,295 | A | 9/2000 | Wexler et al. | |
| 6,422,514 | B1 * | 7/2002 | Clark | B64G 1/4022 244/172.3 |
| 6,550,717 | B2 | 4/2003 | MacCready et al. | |
| 7,871,042 | B2 | 1/2011 | Velicki et al. | |
| 7,980,513 | B2 | 7/2011 | Hoffjann et al. | |
| 9,493,246 | B2 * | 11/2016 | Barmichev | B64D 37/04 |
| 9,604,730 | B2 | 3/2017 | Hagh et al. | |
| 10,222,001 | B2 | 3/2019 | Croteau et al. | |
| 10,279,921 | B2 | 5/2019 | Simpson | |
| 10,457,391 | B2 | 10/2019 | Keegan et al. | |
| 10,577,087 | B2 | 3/2020 | Bouzmane | |
| 10,800,525 | B2 | 10/2020 | Sankrithi et al. | |
| 11,186,375 | B2 | 11/2021 | Wolgast | |
| 11,787,554 | B2 * | 10/2023 | Regnier | B64C 3/34 244/135 R |
| 12,065,239 | B2 * | 8/2024 | Booth | B64C 1/00 |
| 12,473,097 | B2 * | 11/2025 | Kondo | B64C 1/0685 |
| 2004/0069897 | A1 | 4/2004 | Corcoran | |
| 2006/0237583 | A1 * | 10/2006 | Fucke | B64D 13/06 244/58 |
| 2008/0230654 | A1 * | 9/2008 | Velicki | B64D 37/04 244/135 R |
| 2010/0123047 | A1 | 5/2010 | Williams | |
| 2012/0025006 | A1 | 2/2012 | Luther | |
| 2015/0021442 | A1 | 1/2015 | Hunter | |
| 2015/0069184 | A1 * | 3/2015 | Barmichev | B64D 37/30 244/135 R |
| 2015/0321767 | A1 | 11/2015 | Kamath et al. | |
| 2019/0135424 | A1 | 5/2019 | Baity et al. | |
| 2019/0276135 | A1 | 9/2019 | van Merkensteijn, IV | |
| 2022/0388628 | A1 * | 12/2022 | Regnier | B64U 30/10 |
| 2023/0294836 | A1 | 9/2023 | Paget et al. | |

OTHER PUBLICATIONS

Mark D Guynn; Joshuah E. Freeh Erik D. Olson; Evaluation of a Hydrogen Fuel Cell Powered Blended-Wing-Body Aircraft Concept for Reduced Noise and Emissions, Feb. 2004.

"TransCube Cab & Trailer, The Double Walled Fuel Trailer For Refueling Machinery On-Site", Fluidall, Mar. 8, 2022.

Van Woesnel, C.W.C., "Integration of a Liquid Hydrogen Fuel Tank into the Concept of the Flying-V", TU Delft Library, https://resolver.tudelft.nl/uuid:e45d2acb-2c85-4543-9160-536fb5195bc6, Master Thesis (2021).

* cited by examiner

BLENDED WING BODY AIRCRAFT WITH A COMBUSTION ENGINE AND METHOD OF USE

CROSS-REFERENCE TO RELATED APPLICATIONS

This application is a continuation-in-part of Non-provisional application Ser. No. 17/731,622 filed on Apr. 28, 2022, and entitled "BLENDED WING BODY AIRCRAFT WITH A COMBUSTION ENGINE AND METHOD OF USE," the entirety of which is incorporated herein by reference.

FIELD OF THE INVENTION

The present invention generally relates to the field of aircraft. In particular, the present invention is directed to a blended wing body aircraft with a combustion engine and a method of use.

BACKGROUND

Human flight is a large contributor of greenhouse gases, the effects of which are compounded by their release high in the atmosphere. However, non-greenhouse gas generating energy storage methods are less energy dense, according to one or both of volumetric energy density and weight energy density. Presently, current aircraft designs are tightly constrained in both storage volume and weight.

SUMMARY OF THE DISCLOSURE

In an aspect, a system for an aircraft with a combustion engine is disclosed. The aircraft includes at least a fuel source vertically oriented within the aircraft and configured to store a fuel, wherein the at least a fuel source is configured to connect to at least an upper skin and at least a lower skin of the aircraft and at least a flight component configured to propel the aircraft, wherein the at least a flight component comprises a combustion engine, wherein the combustion engine is configured to burn the fuel from the at least a fuel source and produce mechanical work to power the at least a flight component.

In another aspect, a method of use of a system for an aircraft with a combustion engine is disclosed. The method includes vertically orienting at least a fuel source within an aircraft, connecting the at least a fuel source to at least an upper skin and at least a lower skin of the aircraft, storing a fuel using the at least a fuel source, propelling, using at least a flight component, the aircraft, burning, at a combustion engine of the at least a flight component, the fuel from the at least a fuel source and producing, at the combustion engine of the at least a flight component, mechanical work to power the at least a flight component.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for a blended wing body aircraft with a combustion engine. Aspects of the present disclosure may include a blended wing body aircraft. Aspects of the present disclosure may include at least a fuel source located within the blended wing body and configured to store a fuel. Aspects of the present disclosure may also include at least a propulsor configured to propel the blended wing body aircraft. Propulsor may comprise a combustion engine, which differs from a fuel cell, as fuel cells do not convert the fuel into heat first. Aspects of the present disclosure may include at least an auxiliary power unit powered by the fuel and mechanically affixed to the aircraft.

Aspects of the present disclosure can be used to power aircraft propulsors using a combustion engine. Aspects of the present disclosure can also be used to power an auxiliary power unit using a fuel cell.

Aspects of the present disclosure allow for use of non-greenhouse gas emitting fuels to power human flight. Exemplary embodiments illustrating aspects of the present disclosure are described below in the context of several specific examples.

In the following description, for the purposes of explanation, numerous specific details are set forth in order to provide a thorough understanding of the present invention. For purposes of description herein, relating terms, including "upper," "lower," "left," "rear," "right," "front," "vertical," "horizontal," and derivatives thereof relate to embodiments oriented as shown for exemplary purposes in FIG. 1. Furthermore, there is no intention to be bound by any expressed or implied theory presented in this disclosure.

Figure 1:
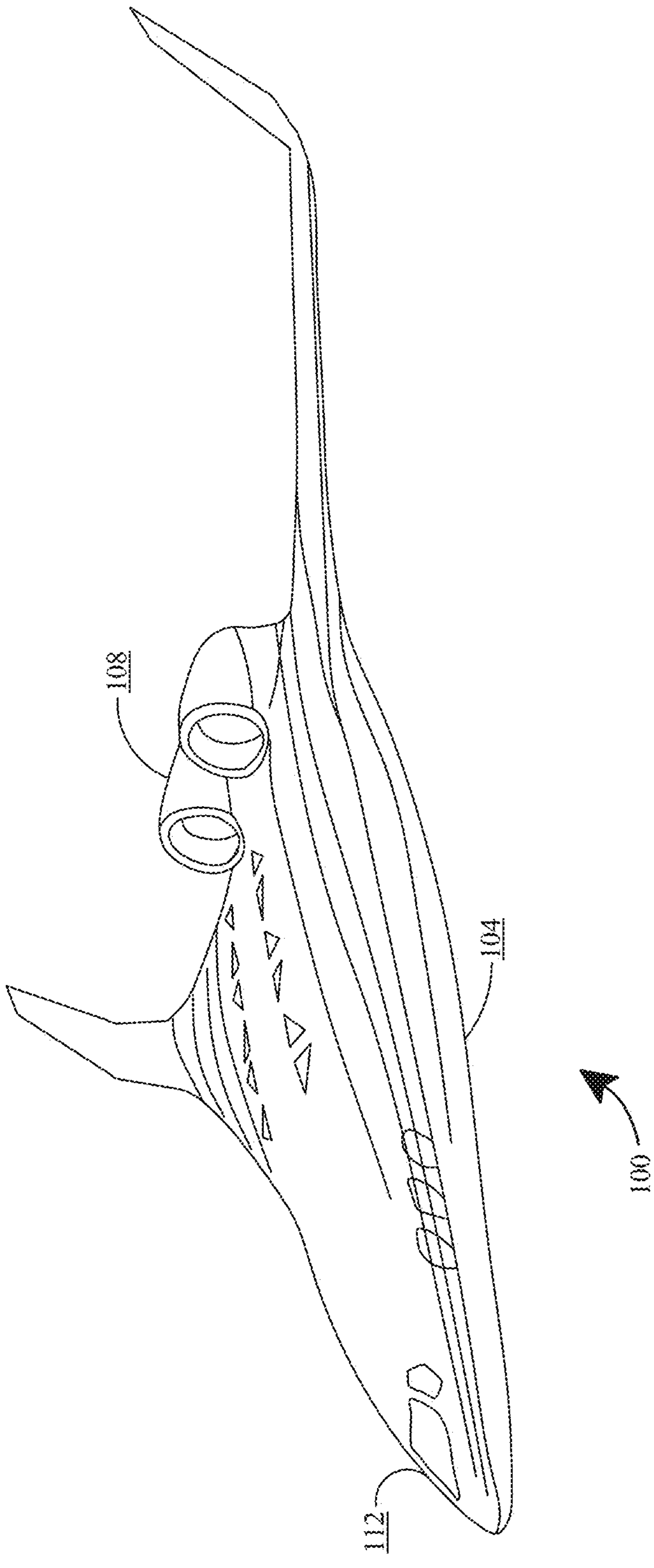
FIG. 1 illustrates a schematic illustration of an exemplary blended wing body aircraft.

Referring now to FIG. 1, an exemplary embodiment of a blended wing body aircraft is illustrated. System may include a computing device. Computing device may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Computing device may include a single computing device operating independently, or may include two or more computing device operating in concert, in parallel, sequentially or the like; two or more computing devices may be included together in a single computing device or in two or more computing devices. Computing device may interface or communicate with one or more additional devices as described below in further detail via a network interface device. Network interface device may be utilized for connecting computing device to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device may include but is not limited to, for example, a computing device or cluster of computing devices in a first location and a second computing device or cluster of computing devices in a second location. Computing device may include one or more computing devices dedicated to data storage, security, distribution of traffic for load balancing, and the like. Computing device may distribute one or more computing tasks as described below across a plurality of computing devices of computing device, which may operate in parallel, in series, redundantly, or in any other manner used for distribution of tasks or memory between computing devices. Computing device may be implemented using a "shared nothing" architecture in which data is cached at the worker, in an embodiment, this may enable scalability of system 100 and/or computing device.

With continued reference to FIG. 1, computing device may be designed and/or configured to perform any method, method step, or sequence of method steps in any embodiment described in this disclosure, in any order and with any degree of repetition. For instance, computing device may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Referring to FIG. 1, an exemplary blended wing aircraft 100 is illustrated. Aircraft 100 may include a blended wing body 104. For the purposes of this disclosure, a "blended wing body aircraft" is an aircraft having a blended wing body. As used in this disclosure, a "blended wing body" (BWB), also known as a "blended body" or a "hybrid wing body" (HWB), is a fixed-wing aircraft body having no clear demarcation between wings and a main body of the aircraft along a leading edge of the aircraft. For example, a BWB 104 aircraft may have distinct wing and body structures, which are smoothly blended together with no clear dividing line or boundary feature between wing and fuselage. This contrasts with a flying wing, which has no distinct fuselage, and a lifting body, which has no distinct wings. A BWB 104 design may or may not be tailless. One potential advantage of a BWB 104 may be to reduce wetted area and any accompanying drag associated with a conventional wing-body junction. In some cases, a BWB 104 may also have a wide airfoil-shaped body, allowing entire aircraft to generate lift and thereby facilitate reduction in size and/or drag of wings. In some cases, a BWB 104 may be understood as a hybrid shape that resembles a flying wing, but also incorporates features from conventional aircraft. In some cases, this combination may offer several advantages over conventional tube-and-wing airframes. In some cases, a BWB airframe 104 may help to increase fuel economy and create larger payload (cargo or passenger) volumes within the BWB 104. BWB 104 may allow for advantageous interior designs. For instance, cargo can be loaded and/or passengers can board from the front or rear of the aircraft. A cargo or passenger area may be distributed across a relatively wide (when compared to conventional tube-wing aircraft) fuselage, providing a large usable volume. In some embodiments, passengers seated within an interior of aircraft, real-time video at every seat can take place of window seats.

With continued reference to FIG. 1, BWB 104 of aircraft 100 may include a nose portion. A "nose portion," for the purposes of this disclosure, refers to any portion of aircraft 100 forward of the aircraft's fuselage. Nose portion may comprise a cockpit (for manned aircraft), canopy, aerodynamic fairings, windshield, and/or any structural elements required to support mechanical loads. Nose portion may also include pilot seats, control interfaces, gages, displays, inceptor sticks, throttle controls, collective pitch controls, and/or communication equipment, to name a few. Nose portion may comprise a swing nose configuration. A swing nose may be characterized by an ability of the nose to move, manually or automatedly, into a differing orientation than its flight orientation to provide an opening for loading a payload into aircraft fuselage from the front of the aircraft. Nose portion may be configured to open in a plurality of orientations and directions.

With continued reference to FIG. 1, BWB 104 may include at least a structural component of aircraft 100. Structural components may provide physical stability during an entirety of an aircraft's 100 flight envelope, while on ground, and during normal operation Structural components may comprise struts, beams, formers, stringers, longerons, interstitials, ribs, structural skin, doublers, straps, spars, or panels, to name a few. Structural components may also comprise pillars. In some cases, for the purpose of aircraft cockpits comprising windows/windshields, pillars may include vertical or near vertical supports around a window configured to provide extra stability around weak points in a vehicle's structure, such as an opening where a window is installed. Where multiple pillars are disposed in an aircraft's 100 structure, they may be so named A, B, C, and so on named from nose to tail. Pillars, like any structural element, may be disposed a distance away from each other, along an exterior of aircraft 100 and BWB 104. Depending on manufacturing method of BWB 104, pillars may be integral to frame and skin, comprised entirely of internal framing, or alternatively, may be only integral to structural skin elements. Structural skin will be discussed in greater detail below.

With continued reference to FIG. 1, BWB 104 may include a plurality of materials, alone or in combination, in its construction. At least a BWB 104, in an illustrative embodiment may include a welded steel tube frame further configured to form a general shape of a nose corresponding to an arrangement of steel tubes. Steel may include any of a plurality of alloyed metals, including but not limited to, a varying amount of manganese, nickel, copper, molybdenum, silicon, and/or aluminum, to name a few. Welded steel tubes may be covered in any of a plurality of materials suitable for aircraft skin. Some of these may include carbon fiber, fiberglass panels, cloth-like materials, aluminum sheeting, or the like. BWB 104 may comprise aluminum tubing mechanically coupled in various and orientations. Mechanical fastening of aluminum members (whether pure aluminum or alloys) may comprise temporary or permanent mechanical fasteners appreciable by one of ordinary skill in the art including, but not limited to, screws, nuts and bolts, anchors, clips, welding, brazing, crimping, nails, blind rivets, pull-through rivets, pins, dowels, snap-fits, clamps, and the like. BWB 104 may additionally or alternatively use wood or another suitably strong yet light material for an internal structure.

With continued reference to FIG. 1, aircraft 100 may include monocoque or semi-monocoque construction. BWB 104 may include carbon fiber. Carbon fiber may include carbon fiber reinforced polymer, carbon fiber reinforced plastic, or carbon fiber reinforced thermoplastic (e.g., CFRP, CRP, CFRTP, carbon composite, or just carbon, depending on industry). "Carbon fiber," as used in this disclosure, is a composite material including a polymer reinforced with carbon. In general, carbon fiber composites consist of two parts, a matrix and a reinforcement. In carbon fiber reinforced plastic, the carbon fiber constitutes the reinforcement, which provides strength. The matrix can include a polymer resin, such as epoxy, to bind reinforcements together. Such reinforcement achieves an increase in CFRP's strength and rigidity, measured by stress and elastic modulus, respectively. In embodiments, carbon fibers themselves can each comprise a diameter between 5-10 micrometers and include a high percentage (i.e. above 85%) of carbon atoms. A person of ordinary skill in the art will appreciate that the advantages of carbon fibers include high stiffness, high tensile strength, low weight, high chemical resistance, high temperature tolerance, and low thermal expansion. According to embodiments, carbon fibers may be combined with other materials to form a composite, when permeated with plastic resin and baked, carbon fiber reinforced polymer becomes extremely rigid. Rigidity may be defined in terms of stress and strain, wherein "stress" is force per area and "strain" is an elongation or deviation generally represented as a proportion or fraction of a length or angle. For example, the strain of a one-hundred-inch-long rod that is stretched to 101 inches is the one inch of stretch divided by the one-hundred-inch length, or a 1% strain. In the case of shear, strain may be measured by an angular deformation. Rigidity may be considered analogous to stiffness and, for linear displacements, may be quantified as Young's modulus. Young's modulus may be defined as stress divided by strain. Rigidity may be defined as a force necessary to bend and/or flex a material and/or structure to a given degree. In embodiments, carbon fibers may additionally, or alternatively, be composited with other materials like graphite to form reinforced carbon-carbon composites, which include high heat tolerances over 1000° C. A person of skill in the art will further appreciate that aerospace applications may require high-strength, low-weight, high heat resistance materials in a plurality of roles, such as without limitation fuselages, fairings, control surfaces, and structures, among others. Additionally, in some embodiments, composite construction may include three elements: carbon fiber, epoxy resin, and a second fiber. In some cases, second fiber may be a thread that is woven through a ply thickness to prevent delamination. Second fiber may be made of a high tensile strength synthetic materials that may provide extra elongation before failure, such as Kevlar and/or an aramid fiber.

With continued reference to FIG. 1, BWB 104 may include at least a fuselage. A "fuselage," for the purposes of this disclosure, refers to a main body of an aircraft 100, or in other words, an entirety of the aircraft 100 except for nose, wings, empennage, nacelles, and control surfaces. In some cases, fuselage may contain an aircraft's payload. At least a fuselage may comprise structural components that physically support a shape and structure of an aircraft 100. Structural components may take a plurality of forms, alone or in combination with other types. Structural components vary depending on construction type of aircraft 100 and specifically, fuselage. A fuselage 112 may include a truss structure. A truss structure may be used with a lightweight aircraft. A truss structure may include welded steel tube trusses. A "truss," as used in this disclosure, is an assembly of beams that create a rigid structure, for example without limitation including combinations of triangles to create three-dimensional shapes. A truss structure may include wood construction in place of steel tubes, or a combination thereof. In some embodiments, structural components can comprise steel tubes and/or wood beams. An aircraft skin may be layered over a body shape constructed by trusses. Aircraft skin may comprise a plurality of materials such as plywood sheets, aluminum, fiberglass, and/or carbon fiber.

With continued reference to FIG. 1, in embodiments, at least a fuselage may comprise geodesic construction. Geodesic structural elements may include stringers wound about formers (which may be alternatively called station frames) in opposing spiral directions. A "stringer," for the purposes of this disclosure is a general structural element that includes a long, thin, and rigid strip of metal or wood that is mechanically coupled to and spans the distance from, station frame to station frame to create an internal skeleton on which to mechanically couple aircraft skin. A former (or station frame) can include a rigid structural element that is disposed along a length of an interior of a fuselage orthogonal to a longitudinal (nose to tail) axis of aircraft 100. In some cases, a former forms a general shape of at least a fuselage. A former may include differing cross-sectional shapes at differing locations along a fuselage, as the former is a structural component that informs an overall shape of the fuselage. In embodiments, aircraft skin can be anchored to formers and strings such that an outer mold line of volume encapsulated by the formers and stringers comprises a same shape as aircraft 100 when installed. In other words, former(s) may form a fuselage's ribs, and stringers may form interstitials between the ribs. A spiral orientation of stringers about formers may provide uniform robustness at any point on an aircraft fuselage such that if a portion sustains damage, another portion may remain largely unaffected. Aircraft skin may be mechanically coupled to underlying stringers and formers and may interact with a fluid, such as air, to generate lift and perform maneuvers.

With continued reference to FIG. 1, according to some embodiments, a fuselage can comprise monocoque construction. Monocoque construction can include a primary structure that forms a shell (or skin in an aircraft's case) and supports physical loads. Monocoque fuselages are fuselages in which the aircraft skin or shell may also include a primary structure. In monocoque construction aircraft skin would support tensile and compressive loads within itself and true monocoque aircraft can be further characterized by an absence of internal structural elements. Aircraft skin in this construction method may be rigid and can sustain its shape with substantially no structural assistance form underlying skeleton-like elements. Monocoque fuselage may include aircraft skin made from plywood layered in varying grain directions, epoxy-impregnated fiberglass, carbon fiber, or any combination thereof.

With continued reference to FIG. 1, according to some embodiments, a fuselage may include a semi-monocoque construction. Semi-monocoque construction, as used in this disclosure, is used interchangeably with partially monocoque construction, discussed above. In semi-monocoque construction, a fuselage may derive some structural support from stressed aircraft skin and some structural support from underlying frame structure made of structural components. Formers or station frames can be seen running transverse to a long axis of fuselage with circular cutouts which may be used in real-world manufacturing for weight savings and for routing of electrical harnesses and other modern on-board systems. In a semi-monocoque construction, stringers may be thin, long strips of material that run parallel to a fuselage's long axis. Stringers can be mechanically coupled to formers permanently, such as with rivets. Aircraft skin can be mechanically coupled to stringers and formers permanently, such as by rivets as well. A person of ordinary skill in the art will appreciate that there are numerous methods for mechanical fastening of the aforementioned components like screws, nails, dowels, pins, anchors, adhesives like glue or epoxy, or bolts and nuts, to name a few. According to some embodiments, a subset of semi-monocoque construction may be unibody construction. Unibody, which is short for "unitized body" or alternatively "unitary construction," vehicles are characterized by a construction in which body, floor plan, and chassis form a single structure, for example an automobile. In the aircraft world, a unibody may include internal structural elements, like formers and stringers, constructed in one piece, integral to an aircraft skin. In some cases, stringers and formers may account for a bulk of any aircraft structure (excluding monocoque construction). Stringers and formers can be arranged in a plurality of orientations depending on aircraft operation and materials. Stringers may be arranged to carry axial (tensile or compressive), shear, bending or torsion forces throughout their overall structure. Due to their coupling to aircraft skin, aerodynamic forces exerted on aircraft skin may be transferred to stringers. Location of said stringers greatly informs type of forces and loads applied to each and every stringer, all of which may be accounted for through design processes including, material selection, cross-sectional area, and mechanical coupling methods of each member. Similar methods may be performed for former assessment and design. In general, formers may be significantly larger in cross-sectional area and thickness, depending on location, than stringers. Both stringers and formers may comprise aluminum, aluminum alloys, graphite epoxy composite, steel alloys, titanium, or an undisclosed material alone or in combination.

With continued reference to FIG. 1, in some cases, a primary purpose for a substructure of a semi-monocoque structure is to stabilize a skin. Typically, aircraft structure is required to have a very light weight and as a result, in some cases, aircraft skin may be very thin. In some cases, unless supported, this thin skin structure may tend to buckle and/or cripple under compressive and/or shear loads. In some cases, underlying structure may be primarily configured to stabilize skins. For example, in an exemplary conventional airliner, wing structure is an airfoil-shaped box with truncated nose and aft triangle; without stabilizing substructure, in some cases, this box would buckle upper skin of the wing and the upper skin would also collapse into the lower skin under bending loads. In some cases, deformations are prevented with ribs that support stringers which stabilize the skin. Fuselages are similar with bulkheads or frames, and stringers.

With continued reference to FIG. 1, in some embodiments, another common structural form is sandwich structure. As used in this disclosure, "sandwich structure" includes a skin structure having an inner and outer skin separated and stabilized by a core material. In some cases, sandwich structure may additionally include some number of ribs or frames. In some cases, sandwich structure may include metal, polymer, and/or composite. In some cases, core material may include honeycomb, foam plastic, and/or end-grain balsa wood. In some cases, sandwich structure can be popular on composite light airplanes, such as gliders and powered light planes. In some cases, sandwich structure may not use stringers, and sandwich structure may allow number of ribs or frames to be reduced, for instance in comparison with a semi-monocoque structure. In some cases, sandwich structure may be suitable for smaller, possibly unmanned, unpressurized blended wing body aircraft.

With continued reference to FIG. 1, stressed skin, when used in semi-monocoque construction, may bear partial, yet significant, load. In other words, an internal structure, whether it be a frame of welded tubes, formers and stringers, or some combination, is not sufficiently strong enough by design to bear all loads. The concept of stressed skin is applied in monocoque and semi-monocoque construction methods of at least a fuselage and/or BWB 104. In some cases, monocoque may be considered to include substantially only structural skin, and in that sense, aircraft skin undergoes stress by applied aerodynamic fluids imparted by fluid. Stress as used in continuum mechanics can be described in pound-force per square inch ($lbf/in^2$) or Pascals (Pa). In semi-monocoque construction stressed skin bears part of aerodynamic loads and additionally imparts force on an underlying structure of stringers and formers.

With continued reference to FIG. 1, a fuselage may include an interior cavity. An interior cavity may include a volumetric space configurable to house passenger seats and/or cargo. An interior cavity may be configured to include receptacles for fuel tanks, batteries, fuel cells, or other energy sources as described herein. In some cases, a post may be supporting a floor (i.e., deck), or in other words a surface on which a passenger, operator, passenger, payload, or other object would rest on due to gravity when within an aircraft 100 is in its level flight orientation or sitting on ground. A post may act similarly to stringer in that it is configured to support axial loads in compression due to a load being applied parallel to its axis due to, for example, a heavy object being placed on a floor of aircraft 100. A beam may be disposed in or on any portion a fuselage that requires additional bracing, specifically when disposed transverse to another structural element, like a post, that would benefit from support in that direction, opposing applied force. A beam may be disposed in a plurality of locations and orientations within a fuselage as necessitated by operational and constructional requirements.

With continued reference to FIG. 1, aircraft 100 may include at least a flight component 108. A flight component 108 may be consistent with any description of a flight component described in this disclosure, such as without limitation propulsors, control surfaces, rotors, paddle wheels, engines, propellers, wings, winglets, or the like. For the purposes of this disclosure, at least a "flight component" is at least one element of an aircraft 100 configured to manipulate a fluid medium such as air to propel, control, or maneuver an aircraft. In nonlimiting examples, at least a flight component may include a rotor mechanically connected to a rotor shaft of an electric motor further mechanically affixed to at least a portion of aircraft 100. In some embodiments, at least a flight component 108 may include a propulsor, for example a rotor attached to an electric motor configured to produce shaft torque and in turn, create thrust. As used in this disclosure, an "electric motor" is an electrical machine that converts electric energy into mechanical work.

With continued reference to FIG. 1, for the purposes of this disclosure, "torque," is a twisting force that tends to cause rotation. Torque may be considered an effort and a rotational analogue to linear force. A magnitude of torque of a rigid body may depend on three quantities: a force applied, a lever arm vector connecting a point about which the torque is being measured to a point of force application, and an angle between the force and the lever arm vector. A force applied perpendicularly to a lever multiplied by its distance from the lever's fulcrum (the length of the lever arm) is its torque. A force of three newtons applied two meters from the fulcrum, for example, exerts the same torque as a force of one newton applied six meters from the fulcrum. In some cases, direction of a torque can be determined by using a right-hand grip rule which states: if fingers of right hand are curled from a direction of lever arm to direction of force, then thumb points in a direction of the torque. One of ordinary skill in the art would appreciate that torque may be represented as a vector, consistent with this disclosure, and therefore may include a magnitude and a direction. "Torque" and "moment" are used interchangeably within this disclosure. Any torque command or signal within this disclosure may include at least the steady state torque to achieve the torque output to at least a propulsor.

With continued reference to FIG. 1, at least a flight component may be one or more devices configured to affect aircraft's 100 attitude. "Attitude," for the purposes of this disclosure, is the relative orientation of a body, in this case aircraft 100, as compared to earth's surface or any other reference point and/or coordinate system. In some cases, attitude may be displayed to pilots, personnel, remote users, or one or more computing devices in an attitude indicator, such as without limitation a visual representation of a horizon and its relative orientation to aircraft 100. A plurality of attitude datums may indicate one or more measurements relative to an aircraft's pitch, roll, yaw, or throttle compared to a relative starting point. One or more sensors may measure or detect an aircraft's 100 attitude and establish one or more attitude datums. An "attitude datum," for the purposes of this disclosure, refers to at least an element of data identifying an attitude of an aircraft 100.

With continued reference to FIG. 1, in some cases, aircraft 100 may include one or more of an angle of attack sensor and a yaw sensor. In some embodiments, one or more of an angle of attack sensor and a yaw sensor may include a vane (e.g., wind vane). In some cases, vane may include a protrusion on a pivot with an aft tail. The protrusion may be configured to rotate about pivot to maintain zero tail angle of attack. In some cases, pivot may turn an electronic device that reports one or more of angle of attack and/or yaw, depending on, for example, orientation of the pivot and tail. Alternatively or additionally, in some cases, one or more of angle of attack sensor and/or yaw sensor may include a plurality of pressure ports located in selected locations, with pressure sensors located at each pressure port. In some cases, differential pressure between pressure ports can be used to estimate angle of attack and/or yaw.

With continued reference to FIG. 1, in some cases, aircraft 100 may include at least a pilot control. As used in this disclosure, a "pilot control," is an interface device that allows an operator, human or machine, to control a flight component of an aircraft. Pilot control may be communicatively connected to any other component presented in aircraft 100, the communicative connection may include redundant connections configured to safeguard against single-point failure. In some cases, a plurality of attitude datums may indicate a pilot's instruction to change heading and/or trim of an aircraft 100. Pilot input may indicate a pilot's instruction to change an aircraft's pitch, roll, yaw, throttle, and/or any combination thereof. Aircraft trajectory may be manipulated by one or more control surfaces and propulsors working alone or in tandem consistent with the entirety of this disclosure. "Pitch," for the purposes of this disclosure refers to an aircraft's angle of attack that is a difference between a plane including at least a portion of both wings of the aircraft running nose to tail and a horizontal flight trajectory. For example, an aircraft may pitch "up" when its nose is angled upward compared to horizontal flight, as in a climb maneuver. In another example, an aircraft may pitch "down," when its nose is angled downward compared to horizontal flight, like in a dive maneuver. In some cases, angle of attack may not be used as an input, for instance pilot input, to any system disclosed herein; in such circumstances proxies may be used such as pilot controls, remote controls, or sensor levels, such as true airspeed sensors, pitot tubes, pneumatic/hydraulic sensors, and the like. "Roll" for the purposes of this disclosure, refers to an aircraft's position about its longitudinal axis that is to say that when an aircraft rotates about its axis from its tail to its nose, and one side rolls upward, as in a banking maneuver. "Yaw," for the purposes of this disclosure, refers to an aircraft's turn angle, when an aircraft rotates about an imaginary vertical axis intersecting center of earth and aircraft 100. "Throttle," for the purposes of this disclosure, refers to an aircraft outputting an amount of thrust from a propulsor. In context of a pilot input, throttle may refer to a pilot's input to increase or decrease thrust produced by at least a propulsor. Flight components 108 may receive and/or transmit signals, for example an aircraft command signal. Aircraft command signal may include any signal described in this disclosure, such as without limitation electrical signal, optical signal, pneumatic signal, hydraulic signal, and/or mechanical signal. In some cases, an aircraft command may be a function of a signal from a pilot control. In some cases, an aircraft command may include or be determined as a function of a pilot command. For example, aircraft commands may be determined as a function of a mechanical movement of a throttle. Signals may include analog signals, digital signals, periodic or aperiodic signal, step signals, unit impulse signal, unit ramp signal, unit parabolic signal, signum function, exponential signal, rectangular signal, triangular signal, sinusoidal signal, sinc function, or pulse width modulated signal. Pilot control may include circuitry, computing devices, electronic components or a combination thereof that translates pilot input into a signal configured to be transmitted to another electronic component. In some cases, a plurality of attitude commands may be determined as a function of an input to a pilot control. A plurality of attitude commands may include a total attitude command datum, such as a combination of attitude adjustments represented by one or a certain number of combinatorial datums. A plurality of attitude commands may include individual attitude datums representing total or relative change in attitude measurements relative to pitch, roll, yaw, and throttle.

With continued reference to FIG. 1, in some embodiments, pilot control may include at least a sensor. As used in this disclosure, a "sensor" is a device that detects a phenomenon. In some cases, a sensor may detect a phenomenon and transmit a signal that is representative of the phenomenon. At least a sensor may include, torque sensor, gyroscope, accelerometer, magnetometer, inertial measurement unit (IMU), pressure sensor, force sensor, proximity sensor, displacement sensor, vibration sensor, among others. At least a sensor may include a sensor suite which may include a plurality of sensors that may detect similar or unique phenomena. For example, in a non-limiting embodiment, sensor suite may include a plurality of accelerometers, a mixture of accelerometers and gyroscopes, or a mixture of an accelerometer, gyroscope, and torque sensor. For the purposes of the disclosure, a "torque datum" is one or more elements of data representing one or more parameters detailing power output by one or more propulsors, flight components, or other elements of an electric aircraft. A torque datum may indicate the torque output of at least a flight component 108. At least a flight component 108 may include any propulsor as described herein. In embodiment, at least a flight component 108 may include an electric motor, a propeller, a jet engine, a paddle wheel, a rotor, turbine, or any other mechanism configured to manipulate a fluid medium to propel an aircraft as described herein. an embodiment of at least a sensor may include or be included in, a sensor suite. The herein disclosed system and method may comprise a plurality of sensors in the form of individual sensors or a sensor suite working in tandem or individually. A sensor suite may include a plurality of independent sensors, as described herein, where any number of the described sensors may be used to detect any number of physical or electrical quantities associated with an aircraft power system or an electrical energy storage system. Independent sensors may include separate sensors measuring physical or electrical quantities that may be powered by and/or in communication with circuits independently, where each may signal sensor output to a control circuit such as a user graphical interface. In a non-limiting example, there may be four independent sensors housed in and/or on battery pack measuring temperature, electrical characteristic such as voltage, amperage, resistance, or impedance, or any other parameters and/or quantities as described in this disclosure. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability of a battery management system and/or user to detect phenomenon is maintained and in a non-limiting example, a user alter aircraft usage pursuant to sensor readings.

With continued reference to FIG. 1, at least a sensor may include a moisture sensor. "Moisture," as used in this disclosure, is the presence of water, this may include vaporized water in air, condensation on the surfaces of objects, or concentrations of liquid water. Moisture may include humidity. "Humidity," as used in this disclosure, is the property of a gaseous medium (almost always air) to hold water in the form of vapor. An amount of water vapor contained within a parcel of air can vary significantly. Water vapor is generally invisible to the human eye and may be damaging to electrical components. There are three primary measurements of humidity, absolute, relative, specific humidity. "Absolute humidity," for the purposes of this disclosure, describes the water content of air and is expressed in either grams per cubic meters or grams per kilogram. "Relative humidity," for the purposes of this disclosure, is expressed as a percentage, indicating a present stat of absolute humidity relative to a maximum humidity given the same temperature. "Specific humidity," for the purposes of this disclosure, is the ratio of water vapor mass to total moist air parcel mass, where parcel is a given portion of a gaseous medium. A moisture sensor may be psychrometer. A moisture sensor may be a hygrometer. A moisture sensor may be configured to act as or include a humidistat. A "humidistat," for the purposes of this disclosure, is a humidity-triggered switch, often used to control another electronic device. A moisture sensor may use capacitance to measure relative humidity and include in itself, or as an external component, include a device to convert relative humidity measurements to absolute humidity measurements. "Capacitance," for the purposes of this disclosure, is the ability of a system to store an electric charge, in this case the system is a parcel of air which may be near, adjacent to, or above a battery cell.

With continued reference to FIG. 1, at least a sensor may include electrical sensors. An electrical sensor may be configured to measure voltage across a component, electrical current through a component, and resistance of a component. Electrical sensors may include separate sensors to measure each of the previously disclosed electrical characteristics such as voltmeter, ammeter, and ohmmeter, respectively. One or more sensors may be communicatively coupled to at least a pilot control, the manipulation of which, may constitute at least an aircraft command. Signals may include electrical, electromagnetic, visual, audio, radio waves, or another undisclosed signal type alone or in combination. At least a sensor communicatively connected to at least a pilot control may include a sensor disposed on, near, around or within at least pilot control. At least a sensor may include a motion sensor. "Motion sensor," for the purposes of this disclosure refers to a device or component configured to detect physical movement of an object or grouping of objects. One of ordinary skill in the art would appreciate, after reviewing the entirety of this disclosure, that motion may include a plurality of types including but not limited to: spinning, rotating, oscillating, gyrating, jumping, sliding, reciprocating, or the like. At least a sensor may include, torque sensor, gyroscope, accelerometer, torque sensor, magnetometer, inertial measurement unit (IMU), pressure sensor, force sensor, proximity sensor, displacement sensor, vibration sensor, among others. At least a sensor may include a sensor suite which may include a plurality of sensors that may detect similar or unique phenomena. For example, in a non-limiting embodiment, sensor suite may include a plurality of accelerometers, a mixture of accelerometers and gyroscopes, or a mixture of an accelerometer, gyroscope, and torque sensor. The herein disclosed system and method may comprise a plurality of sensors in the form of individual sensors or a sensor suite working in tandem or individually. A sensor suite may include a plurality of independent sensors, as described herein, where any number of the described sensors may be used to detect any number of physical or electrical quantities associated with an aircraft power system or an electrical energy storage system. Independent sensors may include separate sensors measuring physical or electrical quantities that may be powered by and/or in communication with circuits independently, where each may signal sensor output to a control circuit such as a user graphical interface. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability to detect phenomenon is maintained and in a non-limiting example, a user alter aircraft usage pursuant to sensor readings.

With continued reference to FIG. 1, at least a flight component 108 may include wings, empennages, nacelles, control surfaces, fuselages, and landing gear, among others, to name a few. In embodiments, an empennage may be disposed at the aftmost point of an aircraft body 104. Empennage may comprise a tail of aircraft 100, further comprising rudders, vertical stabilizers, horizontal stabilizers, stabilators, elevators, trim tabs, among others. At least a portion of empennage may be manipulated directly or indirectly by pilot commands to impart control forces on a fluid in which the aircraft 100 is flying. Manipulation of these empennage control surfaces may, in part, change an aircraft's heading in pitch, roll, and yaw. Wings comprise may include structures which include airfoils configured to create a pressure differential resulting in lift. Wings are generally disposed on a left and right side of aircraft 100 symmetrically, at a point between nose and empennage. Wings may comprise a plurality of geometries in planform view, swept swing, tapered, variable wing, triangular, oblong, elliptical, square, among others. Wings may be blended into the body of the aircraft such as in a BWB 104 aircraft 100 where no strong delineation of body and wing exists. A wing's cross section geometry may comprise an airfoil. An "airfoil" as used in this disclosure, is a shape specifically designed such that a fluid flowing on opposing sides of it exert differing levels of pressure against the airfoil. In embodiments, a bottom surface of an aircraft can be configured to generate a greater pressure than does a top surface, resulting in lift. A wing may comprise differing and/or similar cross-sectional geometries over its cord length, e.g. length from wing tip to where wing meets the aircraft's body. One or more wings may be symmetrical about an aircraft's longitudinal plane, which comprises a longitudinal or roll axis reaching down a center of the aircraft through the nose and empennage, and the aircraft's yaw axis. In some cases, wings may comprise controls surfaces configured to be commanded by a pilot and/or autopilot to change a wing's geometry and therefore its interaction with a fluid medium. Flight component 108 may include control surfaces. Control surfaces may include without limitation flaps, ailerons, tabs, spoilers, and slats, among others. In some cases, control surfaces may be disposed on wings in a plurality of locations and arrangements. In some cases, control surfaces may be disposed at leading and/or trailing edges of wings, and may be configured to deflect up, down, forward, aft, or any combination thereof.

In some cases, flight component 108 may include a winglet. For the purposes of this disclosure, a "winglet" is a flight component configured to manipulate a fluid medium and is mechanically attached to a wing or aircraft and may alternatively called a "wingtip device." Wingtip devices may be used to improve efficiency of fixed-wing aircraft by reducing drag. Although there are several types of wingtip devices which function in different manners, their intended effect may be to reduce an aircraft's drag by partial recovery of tip vortex energy. Wingtip devices can also improve aircraft handling characteristics and enhance safety for aircraft 100. Such devices increase an effective aspect ratio of a wing without greatly increasing wingspan. Extending wingspan may lower lift-induced drag, but would increase parasitic drag and would require boosting the strength and weight of the wing. As a result according to some aeronautic design equations, a maximum wingspan made be determined above which no net benefit exits from further increased span. There may also be operational considerations that limit the allowable wingspan (e.g., available width at airport gates).

Wingtip devices, in some cases, may increase lift generated at wingtip (by smoothing airflow across an upper wing near the wingtip) and reduce lift-induced drag caused by wingtip vortices, thereby improving a lift-to-drag ratio. This increases fuel efficiency in powered aircraft and increases cross-country speed in gliders, in both cases increasing range. U.S. Air Force studies indicate that a given improvement in fuel efficiency correlates directly and causally with increase in an aircraft's lift-to-drag ratio. The term "winglet" has previously been used to describe an additional lifting surface on an aircraft, like a short section between wheels on fixed undercarriage. An upward angle (i.e., cant) of a winglet, its inward or outward angle (i.e., toe), as well as its size and shape are selectable design parameters which may be chosen for correct performance in a given application. A wingtip vortex, which rotates around from below a wing, strikes a cambered surface of a winglet, generating a force that angles inward and slightly forward. A winglet's relation to a wingtip vortex may be considered analogous to sailboat sails when sailing to windward (i.e., close-hauled). Similar to the close-hauled sailboat's sails, winglets may convert some of what would otherwise-be wasted energy in a wingtip vortex to an apparent thrust. This small contribution can be worthwhile over the aircraft's lifetime. Another potential benefit of winglets is that they may reduce an intensity of wake vortices. Wake vortices may trail behind an aircraft 100 and pose a hazard to other aircraft. Minimum spacing requirements between aircraft at airports are largely dictated by hazards, like those from wake vortices. Aircraft are classified by weight (e.g., "Light," "Heavy," and the like) often base upon vortex strength, which grows with an aircraft's lift coefficient. Thus, associated turbulence is greatest at low speed and high weight, which may be produced at high angle of attack near airports. Winglets and wingtip fences may also increase efficiency by reducing vortex interference with laminar airflow near wingtips, by moving a confluence of low-pressure air (over wing) and high-pressure air (under wing) away from a surface of the wing. Wingtip vortices create turbulence, which may originate at a leading edge of a wingtip and propagate backwards and inboard. This turbulence may delaminate airflow over a small triangular section of an outboard wing, thereby frustrating lift in that area. A fence/winglet drives an area where a vortex forms upward away from a wing surface, as the resulting vortex is repositioned to a top tip of the winglet.

With continued reference to FIG. 1, aircraft 100 may include an energy source. Energy source may include any device providing energy to at least a flight component 108, for example at least a propulsors. Energy source may include, without limitation, a generator, a photovoltaic device, a fuel cell such as a hydrogen fuel cell, direct methanol fuel cell, and/or solid oxide fuel cell, or an electric energy storage device; electric energy storage device may include without limitation a battery, a capacitor, and/or inductor. The energy source and/or energy storage device may include at least a battery, battery cell, and/or a plurality of battery cells connected in series, in parallel, or in a combination of series and parallel connections such as series connections into modules that are connected in parallel with other like modules. Battery and/or battery cell may include, without limitation, Li ion batteries which may include NCA, NMC, Lithium iron phosphate (LiFePO4) and Lithium Manganese Oxide (LMO) batteries, which may be mixed with another cathode chemistry to provide more specific power if the application requires Li metal batteries, which have a lithium metal anode that provides high power on demand, Li ion batteries that have a silicon or titanite anode. In embodiments, the energy source may be used to provide electrical power to an electric or hybrid propulsor during moments requiring high rates of power output, including without limitation takeoff, landing, thermal de-icing and situations requiring greater power output for reasons of stability, such as high turbulence situations. In some cases, battery may include, without limitation a battery using nickel based chemistries such as nickel cadmium or nickel metal hydride, a battery using lithium ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), a battery using lithium polymer technology, lead-based batteries such as without limitation lead acid batteries, metal-air batteries, or any other suitable battery. A person of ordinary skill in the art, upon reviewing the entirety of this disclosure, will be aware of various devices of components that may be used as an energy source.

Figure 2:
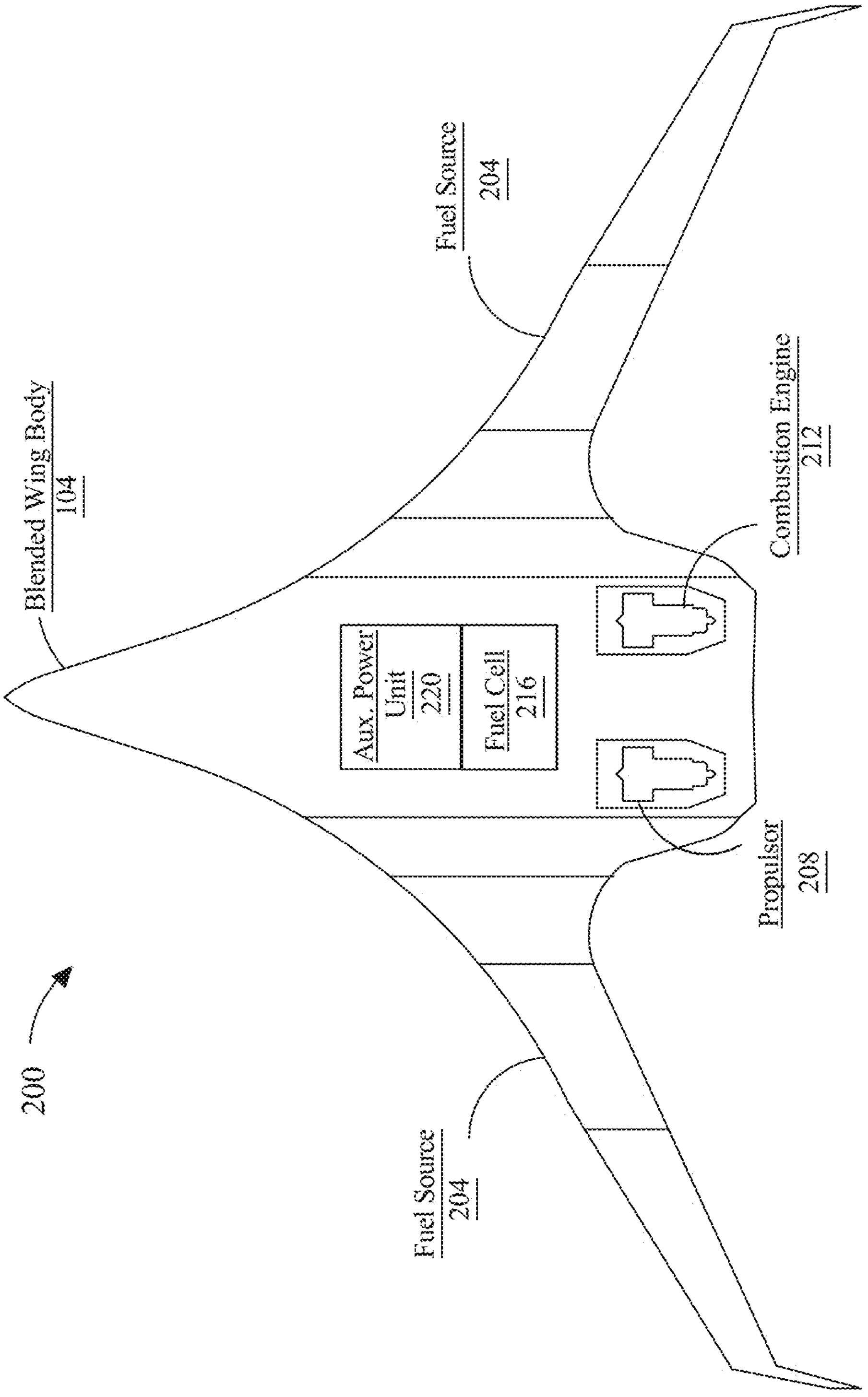
FIG. 2 illustrates a diagram of an exemplary blended wing body aircraft with a combustion engine.

Now referring to FIG. 2, an exemplary blended wing body aircraft with a combustion engine is illustrated. Aircraft 200 may include blended wing body 104, fuel source 204, propulsor 208, combustion engine 212, fuel cell 216, and auxiliary power unit 220. Aircraft 200 may be the same aircraft as aircraft 100, or at least has all the same components and characteristics as described above. As described above, a blended wing body (BWB) is a fixed-wing aircraft body having no clear demarcation between wings and a main body of the aircraft. For example, a BWB 104 aircraft may have distinct wing and body structures, which are smoothly blended together with no clear dividing line or boundary feature between wing and fuselage. As used in this disclosure, a "transitional" portion of blended wing body 104 is the portion of the blended wing body 104 that includes the aircraft body between wing and a main body.

With continued reference to FIG. 2, in further nonlimiting embodiments, an energy source as explained above with reference to FIG. 1 may include a fuel source 204. As used in this disclosure, a "fuel source" is an aircraft component configured to store a fuel. In some cases, a fuel source 204 may include a fuel tank. Fuel tank may include a fuel, which may include liquified gas fuel, liquid hydrogen, or natural gas. As used in this disclosure, a "liquified gas fuel" is a fuel that at standard atmospheric conditions or when utilized (e.g., combusted) is gas and is stored as a fuel. Liquified gas fuels include without limitation liquid hydrogen, propane, and liquified natural gas. As used in this disclosure, a "fuel" may include any substance that stores energy. Exemplary non-limiting fuels include hydrocarbon fuels, petroleum-based fuels., synthetic fuels, chemical fuels, Jet fuels (e.g., Jet-A fuel, Jet-B fuel, and the like), kerosene-based fuel, gasoline-based fuel, an electrochemical-based fuel (e.g., lithium-ion battery), a hydrogen-based fuel, natural gas-based fuel, and the like. As described in greater detail below fuel source 204 may be located substantially within blended wing body 104 of aircraft 200, for example without limitation within a wing portion of blended wing body 108. Aviation fuels may include petroleum-based fuels, or petroleum and synthetic fuel blends, used to power aircraft 200. In some cases, aviation fuels may have more stringent requirements than fuels used for ground use, such as heating and road transport. Aviation fuels may contain additives to enhance or maintain properties important to fuel performance or handling. Fuel may include one or more of liquid hydrogen and liquid natural gas. In some cases, specific energy may be considered an important criterion in selecting fuel for an aircraft 200. Liquid fuel may include Jet-A. Presently Jet-A powers modern commercial airliners and is a mix of extremely refined kerosene and burns at temperatures at or above 49° C. (120° F.). In this embodiment, fuel has a greater energy density per weight and a lesser energy density per volume than conventional kerosene-based fuel. Kerosene-based fuel has a much higher flash point than gasoline-based fuel, meaning that it requires significantly higher temperature to ignite.

Continuing to refer to FIG. 2, aircraft 200 may further include a tank as a fuel source 204. In this disclosure, a "tank" is a container of fluids, for example for flammable fluids, such as fuel. In an embodiment, a tank stores fuel to power aircraft 200. Tank may be permanently attached to aircraft 200. As used in this disclosure, a tank may be "permanently attached" when it is configured to not be removed during ordinary use. For example, a tank permanently attached to aircraft may be removed during maintenance or overhaul but is otherwise a permanent flight component of the aircraft. Tank may include one or more compartments to store fuel in. Tank may be a part of fuel delivery system for an engine, in which the fuel may be stored inside the at least a tank and then propelled or released into an engine, such as without limitation a combustion engine. Tank may be a pressure vessel. A "pressure vessel" is a container configured to hold fluids at a pressure that may differ from an ambient pressure. Pressure vessel may be configured to be pressurized in order to allow flow of gaseous hydrogen from tank, for example without a need to pump. In an embodiment, but without limitation, tank may act as a pressure vessel to store the fuel at a high pressures above 5 psig, 15 psig, 50 psig, or the like. Tank may be made of any material able to withstand such high pressure, such as but without limitation, aluminum, carbon fiber, composite materials, or the like. Furthermore, tank may further include an inner wall and an outer wall. Tank is further discussed herein with reference to FIGS. 3A-J.

In some embodiments, fuel source 204 may be at least partially located within a transitional portion of blended wing body 104. According to some embodiments, fuel source may be configured to store one or more of liquid hydrogen and natural gas. For example, although weight energy density of liquid hydrogen is high, volume energy density of liquid hydrogen is lower than conventional aviation fuels. For this reason, in some cases, fuel source 204 may be located within a transitional portion of blended wing body 104 as greater volume for storage is available here, for example when compared to a wing portion. In some cases, liquid nitrogen may need to be stored at extremely cold temperatures, for instance without limitation at a temperature below −252° C. As liquid hydrogen warms it boils off and is lost. As a result, boil off rate is considered when employing liquid hydrogen as a fuel. In some cases, fuel source 204, or any fuel source containing liquid hydrogen, may be heavily insulated. For example, in some cases, fuel source 204 may include an inner wall and an outer wall with a vacuum chamber disposed between the inner wall and the outer wall. Vacuum within vacuum chamber prevents convective and conductive heat loss between inner and outer wall, so that substantially only radiative heat transfer may be possible between the two walls dramatically slowing heat transfer (and heating). Alternatively or additionally, in some cases, an insulation may be located between inner wall and outer wall of fuel source. Exemplary non-limiting insulations include high loft materials, silica aerogel, polyurethane, polystyrene, fiberglass, and the like. In some cases, a reflective material may be used within a wall of fuel source to slow radiative heat transfer, for example without limitation metallic materials with high polish like foil.

In some cases, a voluminous fuel source 204, for instance located within a transitional portion of blended wing body 104, may be advantageous for liquid hydrogen (or liquid natural gas) storage as it slows a rate of temperature rise of fuel. For instance, heat transfer is a function of surface area of fuel source and may be understood according to Newton's Law of Cooling. Whereas thermal compliance is a function of mass (volume multiplied by density). As a fuel source increases in size, its volume increases more than surface area. This phenomenon may be understood as square-cube law, stated thus when an object undergoes a proportional increase in size, its new surface area is proportional to the square of the multiplier and its new volume is proportional to the cube of the multiplier. For example, imagine a cubic fuel source increases from a first length, $l_1$, to a second length, $l_2$. An area of fuel source may increase thus:

$$A_2 = A_1\left(\frac{l_2}{l_1}\right)^2$$

and, a volume of fuel source increases thus $$V_2 = V_1\left(\frac{l_2}{l_1}\right)^3$$

where $A_1$ is first surface area, $A_2$ is second surface area, $V_1$ is first volume, and $V_2$ is second volume. For example, a cube with a side length of 1 meter has a surface area of 6 $m^2$ and a volume of 1 $m^3$. If dimensions of cube were multiplied by 2, its surface area would be multiplied by the square of 2 and become 24 $m^2$. Its volume would be multiplied by cube of 2 and become 8 $m^3$. The original cube (1 m sides) has a surface area to volume ratio of 6:1. The larger (2 m sides) cube has a surface area to volume ratio of (24/8) 3:1. As dimensions increase, volume will continue to grow faster than surface area. Square-cube principle applies to all solids, not just cubes.

Still referring to FIG. 2, fuel source 204 may comprise at least a fuel environment control mitigation. As used in this disclosure, a "fuel environment mitigation" is any design parameter selected to control an environmental factor associated with fuel within a fuel store. In some cases, fuel environment control mitigation may include a design parameter that affects one or more of fuel pressure, fuel temperature, fuel phase, and the like. For example, in some cases, a fuel environment control mitigation may include insulation to control fuel temperature. Additionally or alternatively, in some cases, fuel environment control mitigation may include a pressure vessel within which fuel pressure may be controlled.

With continued reference to FIG. 2, modular aircraft 200 may include an energy source which may include a fuel cell 216. As used in this disclosure, a "fuel cell" is an electrochemical device that combines a fuel and an oxidizing agent to create electricity. In some cases, fuel cell 216 may be different from most batteries in requiring a continuous source of fuel and oxygen (usually from air) to sustain the chemical reaction, whereas in a battery the chemical energy comes from metals and their ions or oxides that are commonly already present in the battery, except in flow batteries. Fuel cell 216 may produce electricity continuously for as long as fuel and oxygen are supplied.

With continued reference to FIG. 2, in some embodiments, fuel cell 216 may consist of different types. Commonly a fuel cell 216 consists of an anode, a cathode, and an electrolyte that allows ions, often positively charged hydrogen ions (protons), to move between two sides of the fuel cell 216. At anode, a catalyst causes fuel to undergo oxidation reactions that generate ions (often positively charged hydrogen ions) and electrons. Ions move from anode to cathode through electrolyte. Concurrently, electrons may flow from anode to cathode through an external circuit, producing direct current electricity. At cathode, another catalyst causes ions, electrons, and oxygen to react, forming water and possibly other products. Fuel cell 216 may be classified by type of electrolyte used and by difference in startup time ranging from 1 second for proton-exchange membrane fuel cells (PEM fuel cells, or PEMFC) to 10 minutes for solid oxide fuel cells (SOFC). In some cases, energy source may include a related technology, such as flow batteries. Within a flow battery fuel can be regenerated by recharging. Individual fuel cells produce relatively small electrical potentials, about 0.7 volts. Therefore, in some cases, fuel cell 216 may be "stacked," or placed in a series, to create sufficient voltage to meet an application's requirements. In addition to electricity, fuel cell 216 may produce water, heat and, depending on the fuel source, very small amounts of nitrogen dioxide and other emissions. Energy efficiency of a fuel cell 216 is generally between 40 and 90%.

Fuel cell 216 may include an electrolyte. In some cases, electrolyte may define a type of fuel cell 216. Electrolyte may include any number of substances like potassium hydroxide, salt carbonates, and phosphoric acid. Commonly a fuel cell 216 is fueled by hydrogen. Fuel cell 216 may feature an anode catalyst, like fine platinum powder, which breaks down fuel into electrons and ions. Fuel cell 216 may feature a cathode catalyst, often nickel, which converts ions into waste chemicals, with water being the most common type of waste. A fuel cell 216 may include gas diffusion layers that are designed to resist oxidization.

With continued reference to FIG. 2, aircraft 200 may include an energy source which may include a cell such as a battery cell, or a plurality of battery cells making a battery module. An energy source may be a plurality of energy sources. The module may include batteries connected in parallel or in series or a plurality of modules connected either in series or in parallel designed to deliver both the power and energy requirements of the application. Connecting batteries in series may increase the voltage of an energy source which may provide more power on demand. High voltage batteries may require cell matching when high peak load is needed. As more cells are connected in strings, there may exist the possibility of one cell failing which may increase resistance in the module and reduce the overall power output as the voltage of the module may decrease as a result of that failing cell. Connecting batteries in parallel may increase total current capacity by decreasing total resistance, and it also may increase overall amp-hour capacity. The overall energy and power outputs of an energy source may be based on the individual battery cell performance or an extrapolation based on the measurement of at least an electrical parameter. In an embodiment where an energy source includes a plurality of battery cells, the overall power output capacity may be dependent on the electrical parameters of each individual cell. If one cell experiences high self-discharge during demand, power drawn from an energy source may be decreased to avoid damage to the weakest cell. An energy source may further include, without limitation, wiring, conduit, housing, cooling system and battery management system. Persons skilled in the art will be aware, after reviewing the entirety of this disclosure, of many different components of an energy source.

With continued reference to FIG. 2, aircraft 200 may include multiple flight component 108 sub-systems, each of which may have a separate energy source. For instance, and without limitation, one or more flight components 108 may have a dedicated energy source. Alternatively, or additionally, a plurality of energy sources may each provide power to two or more flight components 108, such as, without limitation, a "fore" energy source providing power to flight components located toward a front of an aircraft 200, while an "aft" energy source provides power to flight components located toward a rear of the aircraft 200. As a further non-limiting example, a flight component of group of flight components may be powered by a plurality of energy sources. For example, and without limitation, two or more energy sources may power one or more flight components; two energy sources may include, without limitation, at least a first energy source having high specific energy density and at least a second energy source having high specific power density, which may be selectively deployed as required for higher-power and lower-power needs. Alternatively, or additionally, a plurality of energy sources may be placed in parallel to provide power to the same single propulsor or plurality of propulsors, as explained below. Alternatively, or additionally, two or more separate propulsion subsystems may be joined using intertie switches (not shown) causing the two or more separate propulsion subsystems to be treatable as a single propulsion subsystem or system, for which potential under load of combined energy sources may be used as the electric potential. Persons skilled in the art, upon reviewing the entirety of this disclosure, will be aware of various combinations of energy sources that may each provide power to single or multiple propulsors in various configurations.

With continued reference to FIG. 2, aircraft 200 may include a flight component 108 that includes at least a nacelle. For the purposes of this disclosure, a "nacelle" is a streamlined body housing, which is sized according to that which is houses, such as without limitation an engine, a fuel store, or a flight component. When attached by a pylon entirely outside an BWB airframe 104 a nacelle may sometimes be referred to as a pod, in which case an engine within the nacelle may be referred to as a podded engine. In some cases an aircraft cockpit may also be housed in a nacelle, rather than in a conventional fuselage. At least a nacelle may substantially encapsulate a propulsor, which may include a motor or an engine. At least a nacelle may be mechanically connected to at least a portion of aircraft 200 partially or wholly enveloped by an outer mold line of the aircraft 200. At least a nacelle may be designed to be streamlined. At least a nacelle may be asymmetrical about a plane comprising the longitudinal axis of the engine and the yaw axis of modular aircraft 200.

With continued reference to FIG. 2, a flight component 108 may include a propulsor 208. A "propulsor," as used herein, is a component or device used to propel a craft by exerting force on a fluid medium, which may include a gaseous medium such as air or a liquid medium such as water. For the purposes of this disclosure, "substantially encapsulate" is the state of a first body (e.g., housing) surrounding all or most of a second body. A motor may include without limitation, any electric motor, where an electric motor is a device that converts electrical energy into mechanical work for instance by causing a shaft to rotate. A motor may be driven by direct current (DC) electric power; for instance, a motor may include a brushed DC motor or the like. A motor may be driven by electric power having varying or reversing voltage levels, such as alternating current (AC) power as produced by an alternating current generator and/or inverter, or otherwise varying power, such as produced by a switching power source. A motor may include, without limitation, a brushless DC electric motor, a permanent magnet synchronous motor, a switched reluctance motor, and/or an induction motor; persons skilled in the art, upon reviewing the entirety of this disclosure, will be aware of various alternative or additional forms and/or configurations that a motor may take or exemplify as consistent with this disclosure. In addition to inverter and/or switching power source, a circuit driving motor may include electronic speed controllers or other components for regulating motor speed, rotation direction, torque, and/or dynamic braking. Motor may include or be connected to one or more sensors detecting one or more conditions of motor; one or more conditions may include, without limitation, voltage levels, electromotive force, current levels, temperature, current speed of rotation, position sensors, and the like. For instance, and without limitation, one or more sensors may be used to detect back-EMF, or to detect parameters used to determine back-EMF, as described in further detail below. One or more sensors may include a plurality of current sensors, voltage sensors, and speed or position feedback sensors. One or more sensors may communicate a current status of motor to a flight controller and/or a computing device; computing device may include any computing device as described in this disclosure, including without limitation, a flight controller.

With continued reference to FIG. 2, a motor may be connected to a thrust element. Thrust element may include any device or component that converts mechanical work, for example of a motor or engine, into thrust in a fluid medium. Thrust element may include, without limitation, a device using moving or rotating foils, including without limitation one or more rotors, an airscrew or propeller, a set of airscrews or propellers such as contra-rotating propellers or co-rotating propellers, a moving or flapping wing, or the like. Thrust element may include without limitation a marine propeller or screw, an impeller, a turbine, a pump-jet, a paddle or paddle-based device, or the like. Thrust element may include a rotor. Persons skilled in the art, upon reviewing the entirety of this disclosure, will be aware of various devices that may be used as thrust element. A thrust element may include any device or component that converts mechanical energy (i.e., work) of a motor, for instance in form of rotational motion of a shaft, into thrust within a fluid medium. As another non-limiting example, a thrust element may include an eight-bladed pusher propeller, such as an eight-bladed propeller mounted behind the engine to ensure the drive shaft is in compression.

With continued reference to FIG. 2, in non-limiting embodiments, at least a flight component 108 may include an airbreathing engine such as a jet engine, turbojet engine, turboshaft engine, ramjet engine, scram jet engine, hybrid propulsion system, turbofan engine, or the like. At least a flight component 108 may be fueled by any fuel described in this disclosure, for instance without limitation Jet-A, Jet-B, diesel fuel, gasoline, or the like. In nonlimiting embodiments, a jet engine is a type of reaction engine discharging a fast-moving jet that generates thrust by jet propulsion. While this broad definition can include rocket, water jet, and hybrid propulsion, the term jet engine, in some cases, refers to an internal combustion airbreathing jet engine such as a turbojet, turbofan, ramjet, or pulse jet. In general, jet engines are internal combustion engines. In this embodiment, engine of aircraft 200 may be a combustion engine 212. Combustion engine 212 is further explained below. In nonlimiting embodiments, airbreathing jet engines feature a rotating air compressor powered by a turbine, with leftover power providing thrust through a propelling nozzle—this process may be known as a Brayton thermodynamic cycle. Jet aircraft may use such engines for long-distance travel. Early jet aircraft used turbojet engines that were relatively inefficient for subsonic flight. Most modern subsonic jet aircraft use more complex high-bypass turbofan engines. In some cases, they give higher speed and greater fuel efficiency than piston and propeller aeroengines over long distances. A few air-breathing engines made for high-speed applications (ramjets and scramjets) may use a ram effect of aircraft's speed instead of a mechanical compressor. An airbreathing jet engine (or ducted jet engine) may emit a jet of hot exhaust gases formed from air that is forced into the engine by several stages of centrifugal, axial or ram compression, which is then heated and expanded through a nozzle. In some cases, a majority of mass flow through an airbreathing jet engine may be provided by air taken from outside of the engine and heated internally, using energy stored in the form of fuel. In some cases, a jet engine may include are turbofans. Alternatively and/or additionally, jet engine may include a turbojets. In some cases, a turbofan may use a gas turbine engine core with high overall pressure ratio (e.g., 40:1) and high turbine entry temperature (e.g., about 1800 K) and provide thrust with a turbine-powered fan stage. In some cases, thrust may also be at least partially provided by way of pure exhaust thrust (as in a turbojet engine). In some cases, a turbofan may have a high efficiency, relative to a turbojet. In some cases, a jet engine may use simple ram effect (e.g., ramjet) or pulse combustion (e.g., pulsejet) to give compression. Persons skilled in the art, upon reviewing the entirety of this disclosure, will be aware of various devices that may be used as a thrust element.

Still referring to FIG. 2, a propulsor 208 of aircraft 200 may comprise a combustion engine. As used in this disclosure, a "combustion engine" is a mechanical device that is configured to convert mechanical work from heat produced by combustion of a fuel. In some cases, a combustion engine 212 may operate according to an approximation of a thermodynamic cycle, such as without limitation a Carnot cycle, a Cheng cycle, a Combined cycle, a Brayton cycle, an Otto cycle, an Allam power cycle, a Kalina cycle, a Rankine cycle, and/or the like. In some cases, a combustion engine 212 may include an internal combustion engine 212. An internal combustion engine 212 may include heat engine in which combustion of fuel occurs with an oxidizer (usually air) in a combustion chamber that comprises a part of a working fluid flow circuit. Exemplary internal combustion engines 212 may without limitation a reciprocating engine (e.g., 4-stroke engine), a combustion turbine engine (e.g., jet engines, gas turbines, Brayton cycle engines, and the like), a rotary engine (e.g., Wankel engines), and the like. Combustion engine is configured to burn the fuel from the fuel source to produce mechanical work. Resulting mechanical work may be used to power the propulsor. Additionally, at least an electric motor of the propulsor may be operatively connected with a fuel cell by way of electrical communication, for example through one or more conductors.

Still referring to FIG. 2, aircraft 200 may comprise at least an auxiliary power unit 220 powered by the fuel and mechanically affixed to aircraft 200. As used in this disclosure, an "auxiliary power unit" is a power system, such as without limitation an electrical circuit or mechanical power source, that provides electrical energy to non-propulsor flight components of an aircraft. In this disclosure, at least a fuel cell 216 is providing electrical power to the aircraft as an auxiliary power unit 220. In other words, at least a fuel cell 216 and at least an auxiliary power unit 220 operate as the same unit. Exemplary non-limiting non-propulsor flight component include an avionic system, a flight control system, an environmental control system, and anti-ice system, a lighting system, a fuel system, a braking system, and/or a landing gear system. In some cases, auxiliary power unit 220 may include a motor configured to convert electric energy to mechanical work. In some cases, motor may be used to operate a compressor, for instance of air conditioning or refrigeration system. In some cases, auxiliary power unit 220 may include a motor that is configured to start a combustion engine 216 of at least a propulsor 212.

Figure 3A:
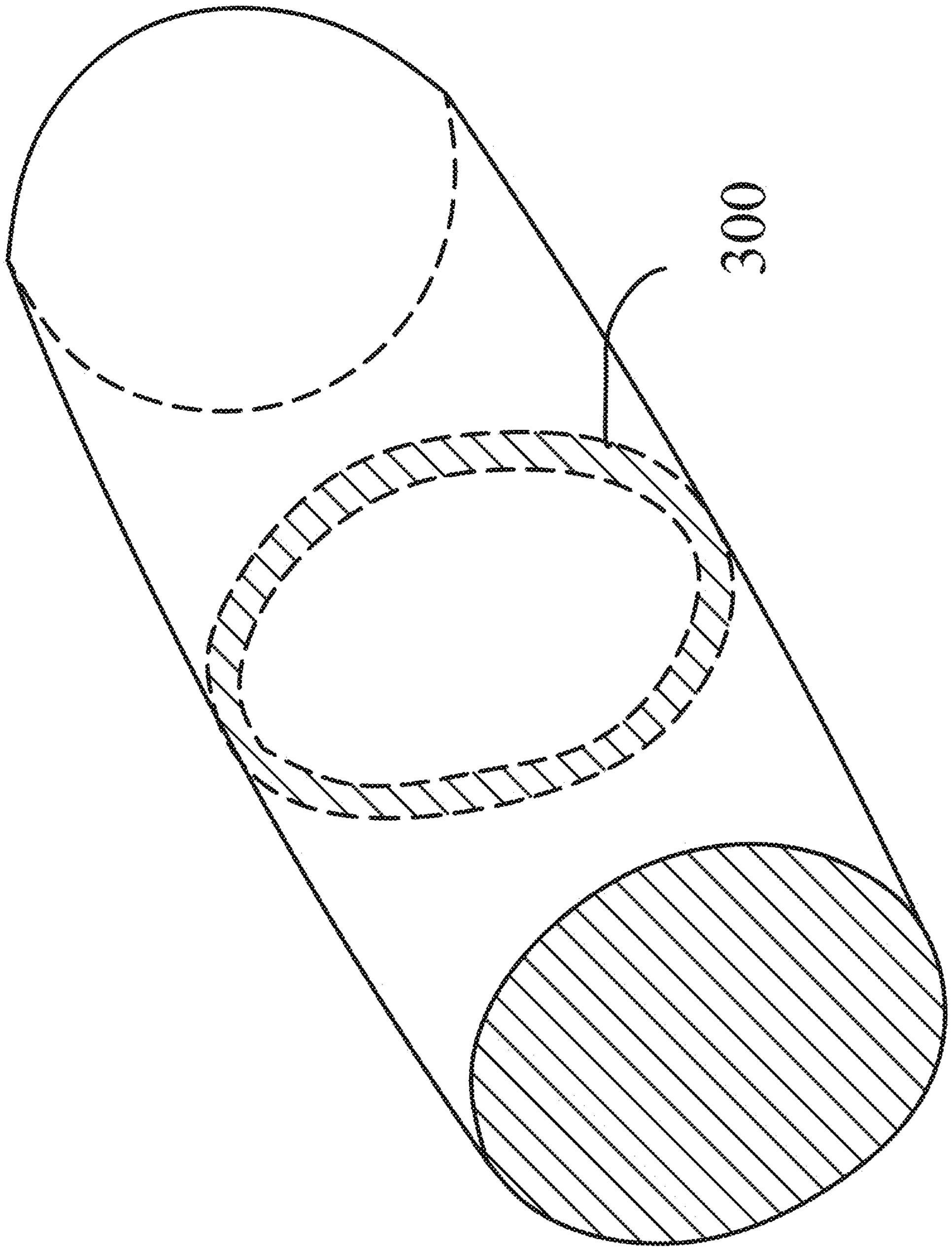
FIG. 3A illustrates an exemplary embodiment of at least a tank with mathematical equations to calculate the force and stress of the at least a tank.

Now referring to FIG. 3A, shown is an exemplary embodiment of at least a tank of fuel source 204. In FIG. 3A, force and stress of at least a tank may be considered in a cylindrical portion 300 and an end of the cylindrical portion. Stress within cylindrical portion may be calculated according to:

$$\text{Stress} = \frac{\pi r^2 P}{2\pi r t} = \frac{Pr}{2t}$$

where, r is radius of the cylinder, P is pressure, and t is thickness of tank wall. Force at end of the cylinder may be found according to:

$$\text{Force} = \pi r^2 P$$

A key component that may heavily impact shape of the tank may be pressure. Tank may be far lighter if pressure is resisted in pure tension as compared to bending. In some embodiments, pure tension in a tank may be generally achieved by shapes that provide a circular cross section, including spheres, cylinders, and cones. In an embodiment, a pressurized tank of a given volume may be made as a sphere to place the tank in pure tension. Alternatively, a tank made as a cube may require tank walls to operate in bending; thus, the cube tank would likely be vastly heavier than a sphere tank of similar volume. Accordingly, in some embodiments, any tank geometry may provide tank walls acting in tension.

Still referring to FIG. 3A, the walls of tank may operate at or below a limit stress. A "limit stress" is a threshold stress below which tank may operate at to avoid failure or damage. Stress may be defined in hoop direction or longitudinal direction. As shown in FIG. 3A, stress of a thin-wall cylindrical tank may be calculated in the hoop direction by multiplying the pressure (e.g., in lb/in$^2$) by the radius (e.g., in inches), and then dividing that value by the tank wall thickness (e.g., in inches). Also as shown in FIG. 3A, the stress of a thin-wall cylindrical tank may be calculated in the longitudinal direction by dividing the hoop stress in half. The mathematical equation shown for stress may be found by first calculating a force by multiplying pi by the radius squared and the pressure. The force is then divided by 2*π*r*t to calculate the stress. Thus, the equation simplifies to half the hoop stress, or P*r/2*t. The maximum stress in a cylindrical tank is the vector sum of the hoop and longitudinal stresses. A thin-wall hemisphere provides equal stress everywhere of P*r/2*t. A cylindrical tank may be fabricated with hemispherical end caps. If the end caps have twice the radius of the cylinder, and the skin thickness is the same everywhere, then the stresses in all parts of the tank may be similar.

Figure 3B:
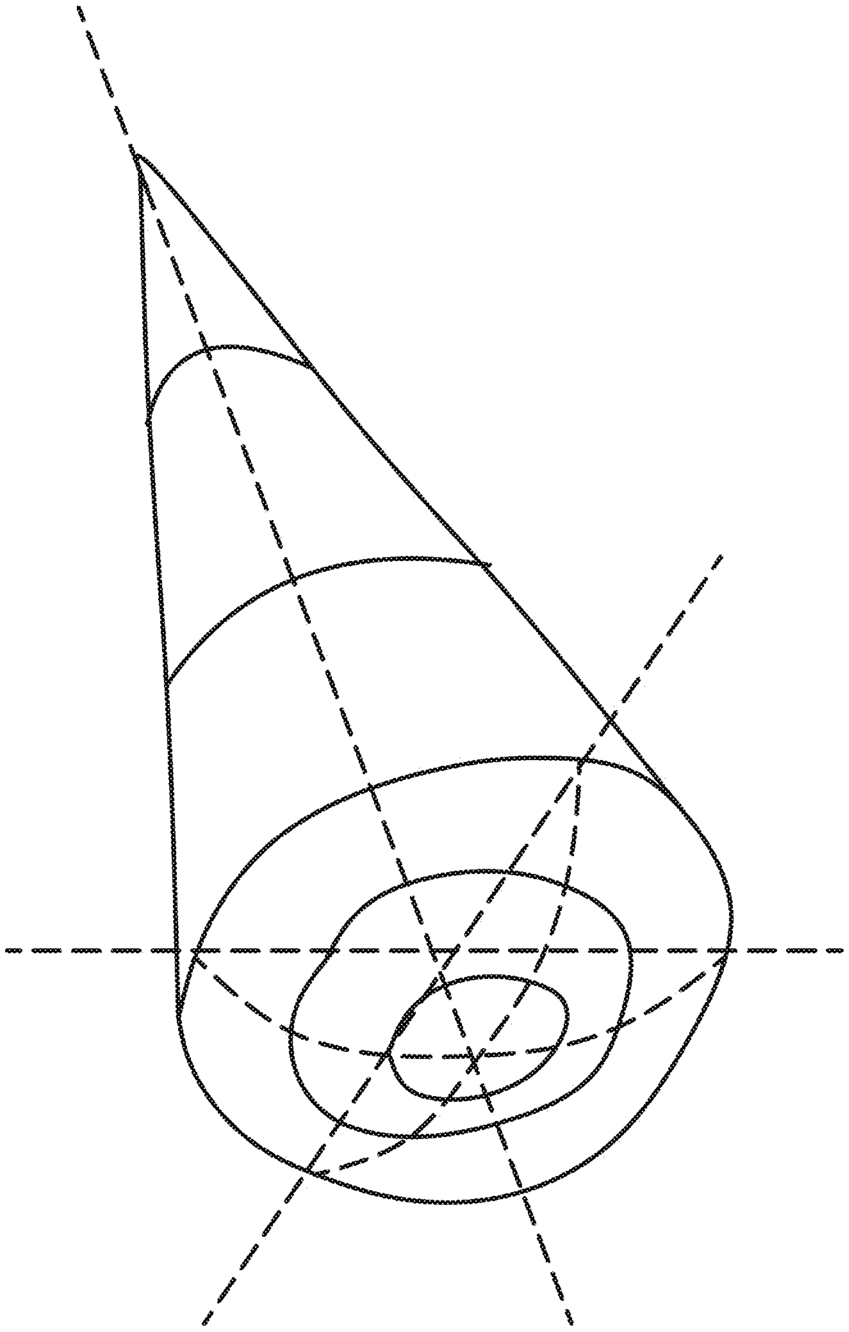
FIG. 3B illustrates an isometric view of an exemplary embodiment of a conical tank.

Now referring to just FIG. 3B, an isometric view of an exemplary embodiment of a conical tank is illustrated. Tank may be a conical tank. A "conical" tank is a type of tapered tank that has a cone-shaped tank geometry. Conical pure-tension tank shapes may include spherical and cylindrical shapes, possibly with spherical end caps. For example, a tank could be conical with a spherical end cap. This might resemble an ice cream cone. This cone may be truncated, with another spherical end cap on the opposing end.

Figure 3C:
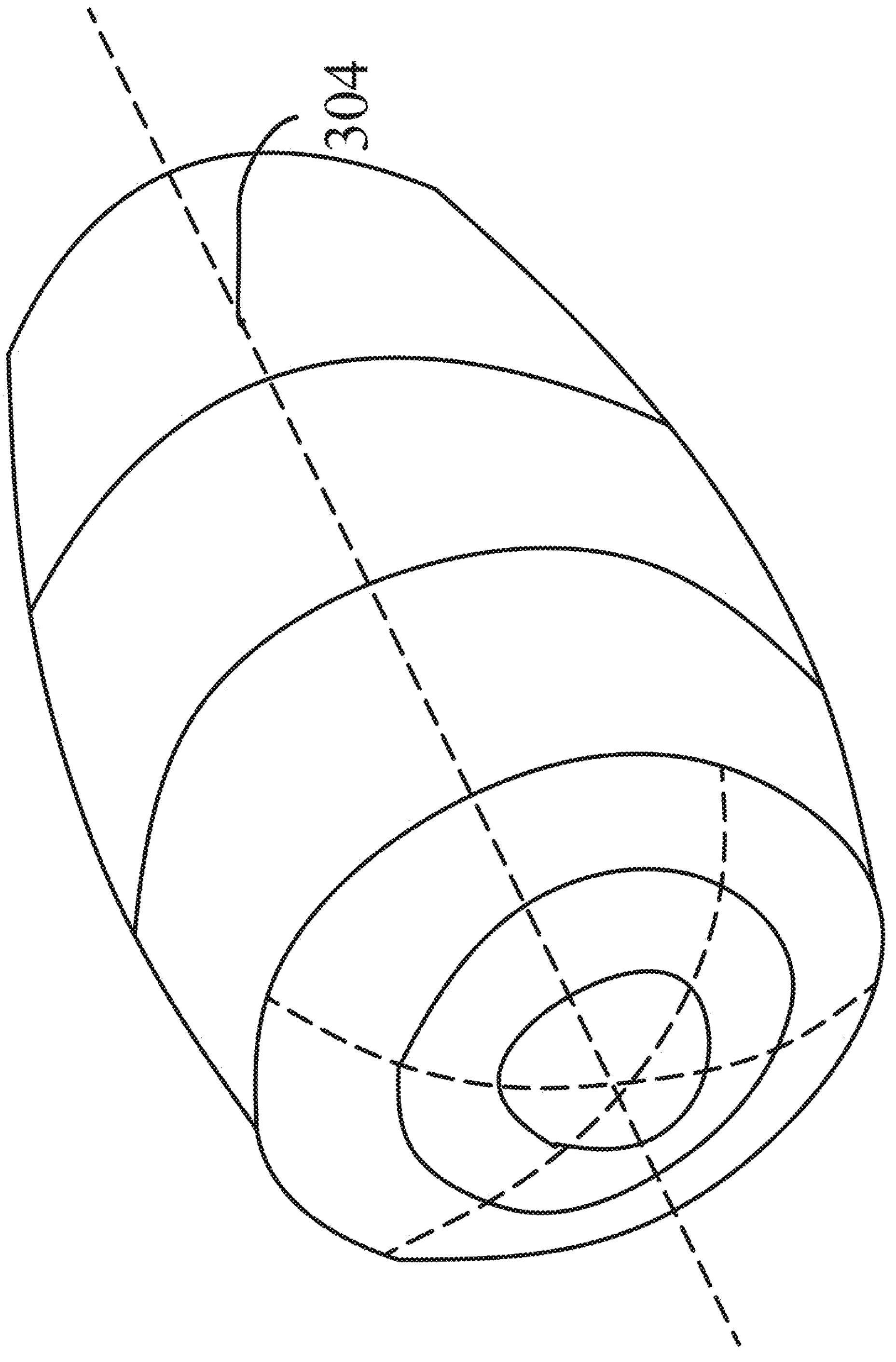
FIG. 3C illustrates an isometric view of an exemplary embodiment of a curved axisymmetric tank.

Now referring to FIG. 3C, an isometric view of an exemplary embodiment of a curved axisymmetric tank is exhibited. Tank may be a curved axisymmetric tank. Another type of tapered tank, a "curved axisymmetric tank" has a circular cross-section with compound curvature on the sides or ends. Curved axisymmetric tank may be capped with hemispheres. A curved axisymmetric tank may more efficiently fill a volume with variable depth.

Figure 3D:
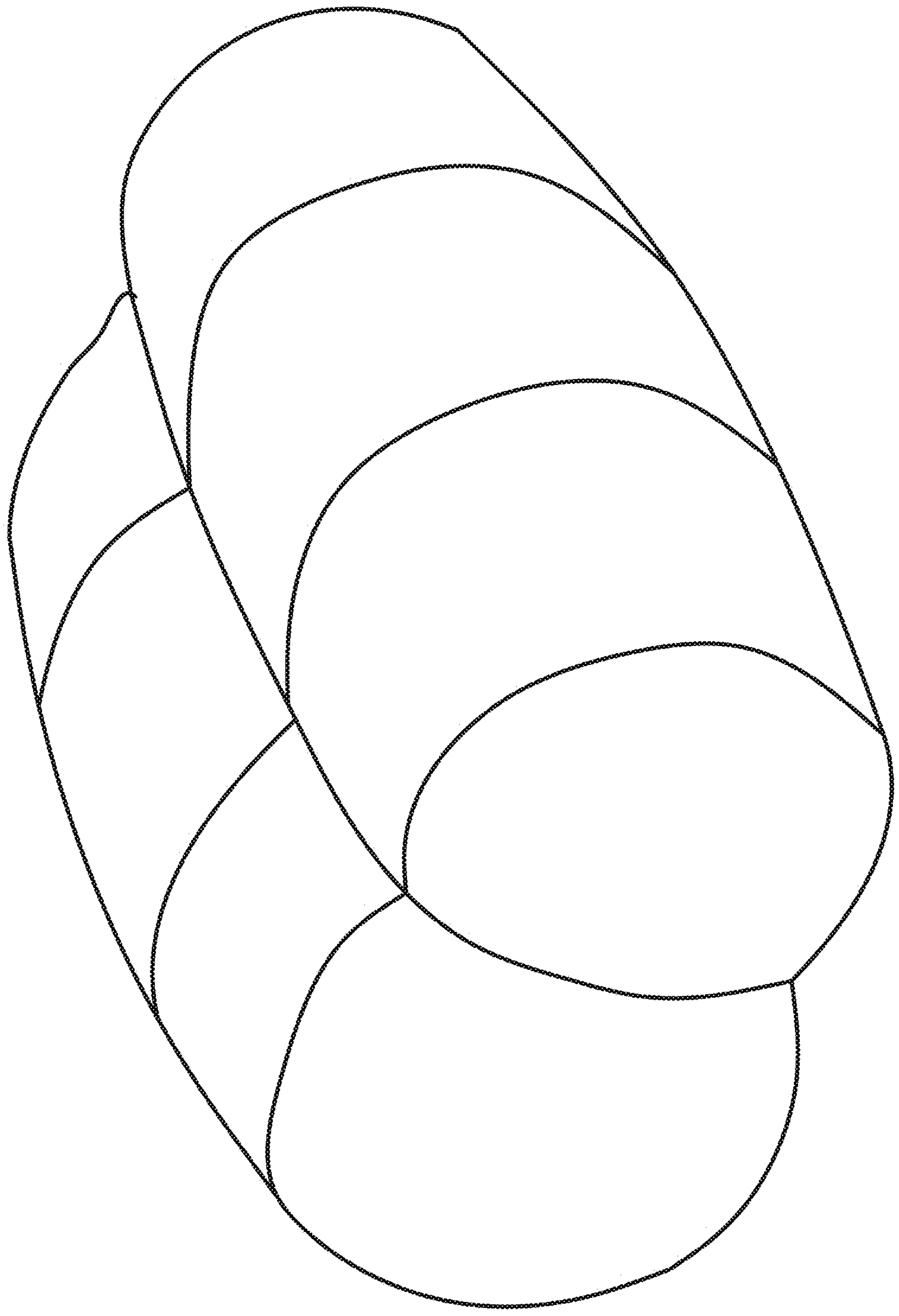
FIG. 3D illustrates an isometric view of an exemplary embodiment of a double-curved tank.

Now referring to FIG. 3D, an isometric view of an exemplary embodiment of a double-curved tank is presented. Tank may be a double-curved tank. A "double-curved tank" occurs when a tapered tank is merged with a similar or mirror-image tank with a central septum. The two tanks comprising a double-curved tank may be intersected along their length and a septum may be placed at the tank junction to address the resulting tension. In this disclosure, a "central septum" is a partition centrally located in a system separating two compartments. In some cases, central septum may not be parallel to the tank axis; for example, it may be favorable to fill a volume of constant width with a curved, variable-height ceiling. Tank axis may then be adjusted so that the tank wall on the outer side of the tank may be a selected distance from the compartment wall.

Figure 3E:
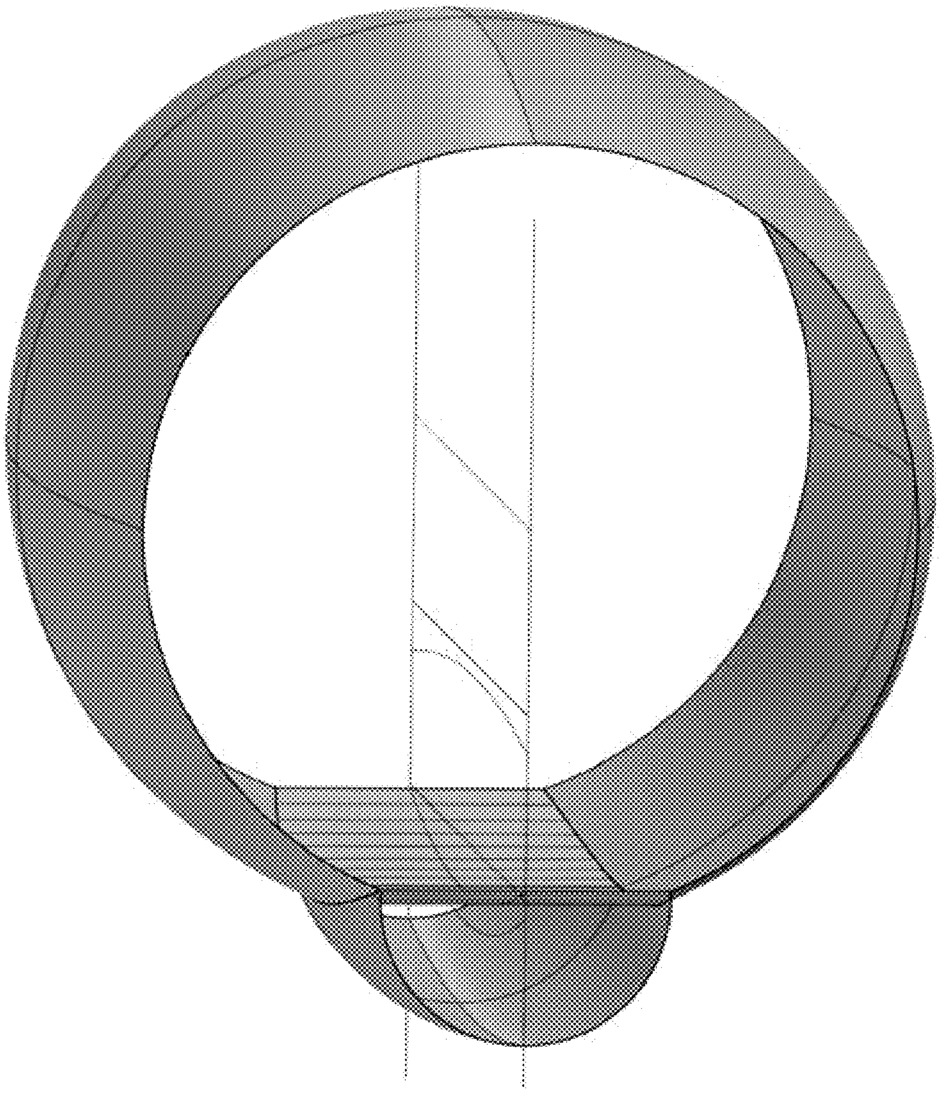
FIG. 3E illustrates a front quarter view of an exemplary embodiment of a dual tank with different diameters.

Now referring to FIG. 3E, a double-curved tank need not have identical compartments; a front quarter view of an exemplary embodiment of a dual tank with different diameters is illustrated. Tank may be a dual tank with different diameters. In some compartments in this embodiment, height on one side of the compartment may be lower than on the other. Two or more compartments in tank may have different diameters if the ceiling height is different across the compartment. The two or more tanks may be joined with one or more septa that may form a curved surface as seen in top view, see cambered tanks below. In an embodiment, the shapes of the compartments may differ. In this case, the two merged tanks (dual tank) may have different diameters to maximize their height along their length.

Figure 3F:
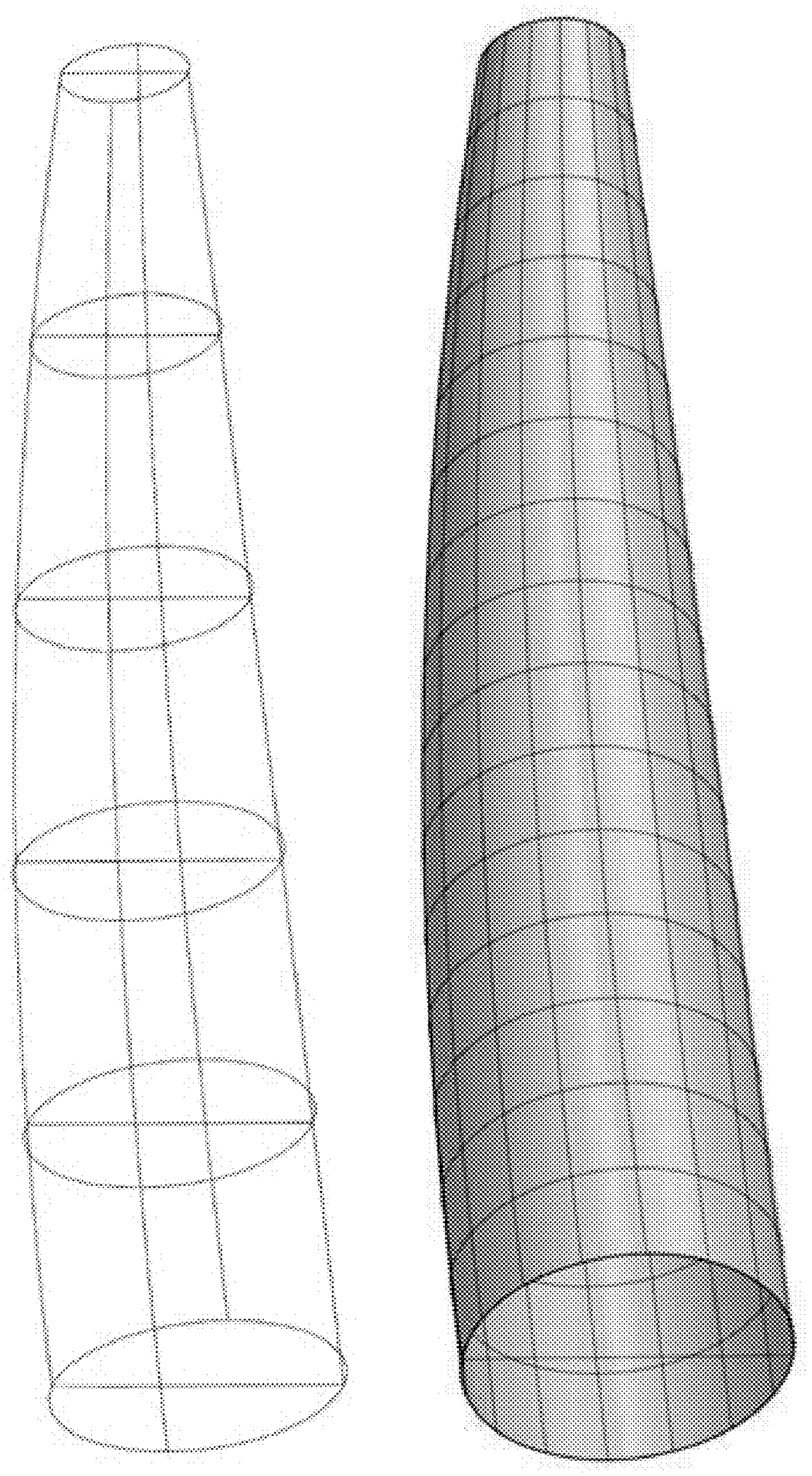
FIG. 3F illustrates a quarter side view of an exemplary embodiment of a cambered, tapered tank.

Now referring to FIG. 3F, some tapered tanks may be sheared so that instead of following a straight centerline, tank follows a curved camber line. Shown in FIG. 3F is a quarter side view of an exemplary embodiment of a cambered, tapered tank. The camber line enables the tank to more efficiently fit a volume with variable depth but one flat side, for example a floor, while conforming more closely to, for example, a curved ceiling. This results in a centerline that may be curved as seen in the figure. An example may be shown in wireframe and surfaced views. This tank geometry may have a flat bottom and a curved top.

Figure 3G:
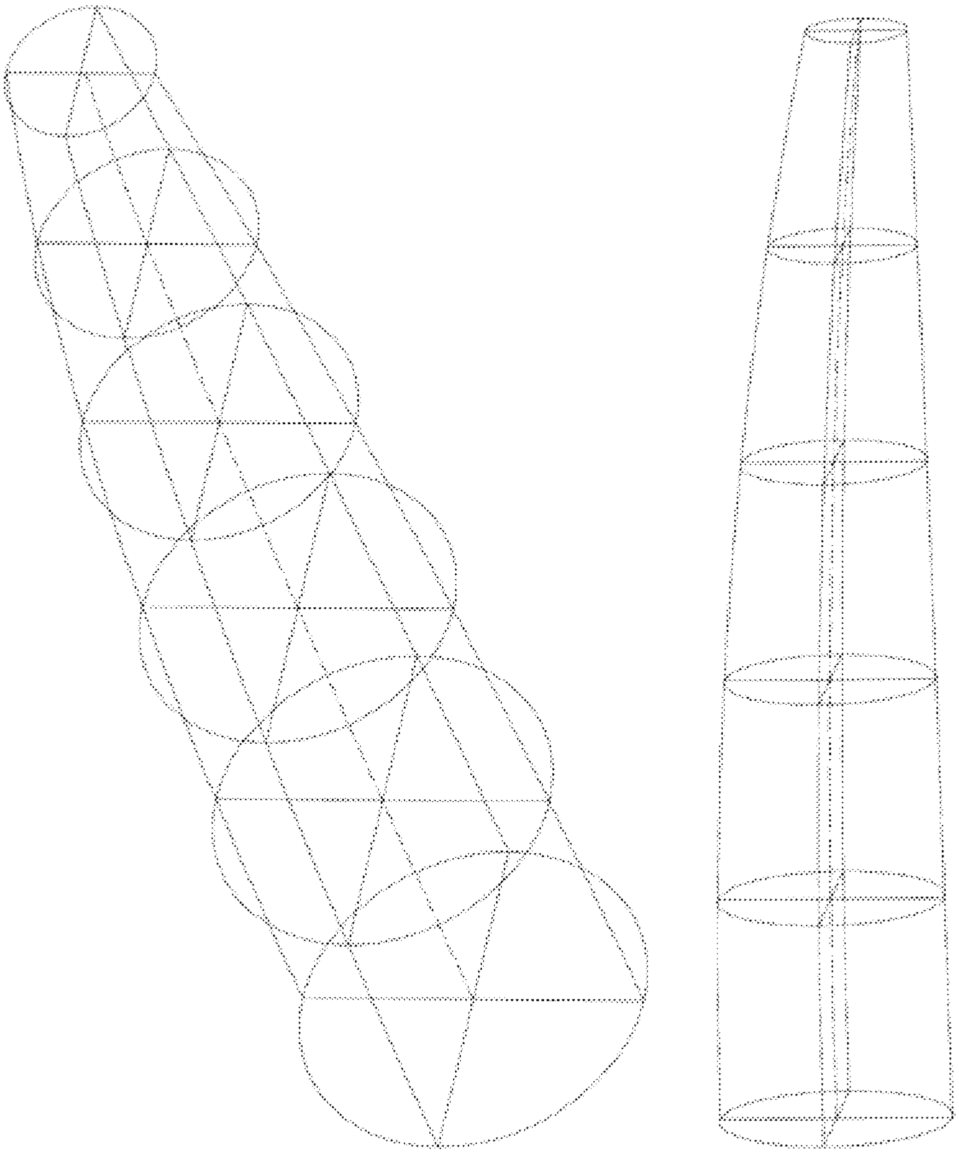
FIG. 3G illustrates an isometric and side quarter views of an exemplary embodiment of a dual cambered tank.

Now referring to FIG. 3G, an isometric and side quarter views of an exemplary embodiment of a dual-cambered tank is presented. Tank may be a dual-cambered tank. A "dual-cambered" tank is the same as normal cambered tank, but the camber line may be curved from the top view as well as the side view. Two cambered lines can place the outer surface of the tank at a selected distance from the compartment wall. The bottom and right edge of tank may be straight while the top view and side view of camber line may be curved. Circular cross sections of the tank may be sheared so that they remain circles in the lateral-vertical plane, for example. Alternatively, circular cross sections may be orthogonal to the camber line. From a stress standpoint, wherever the camber line curvature of the tank is modest, the stress difference is probably very small.

Figure 3H:
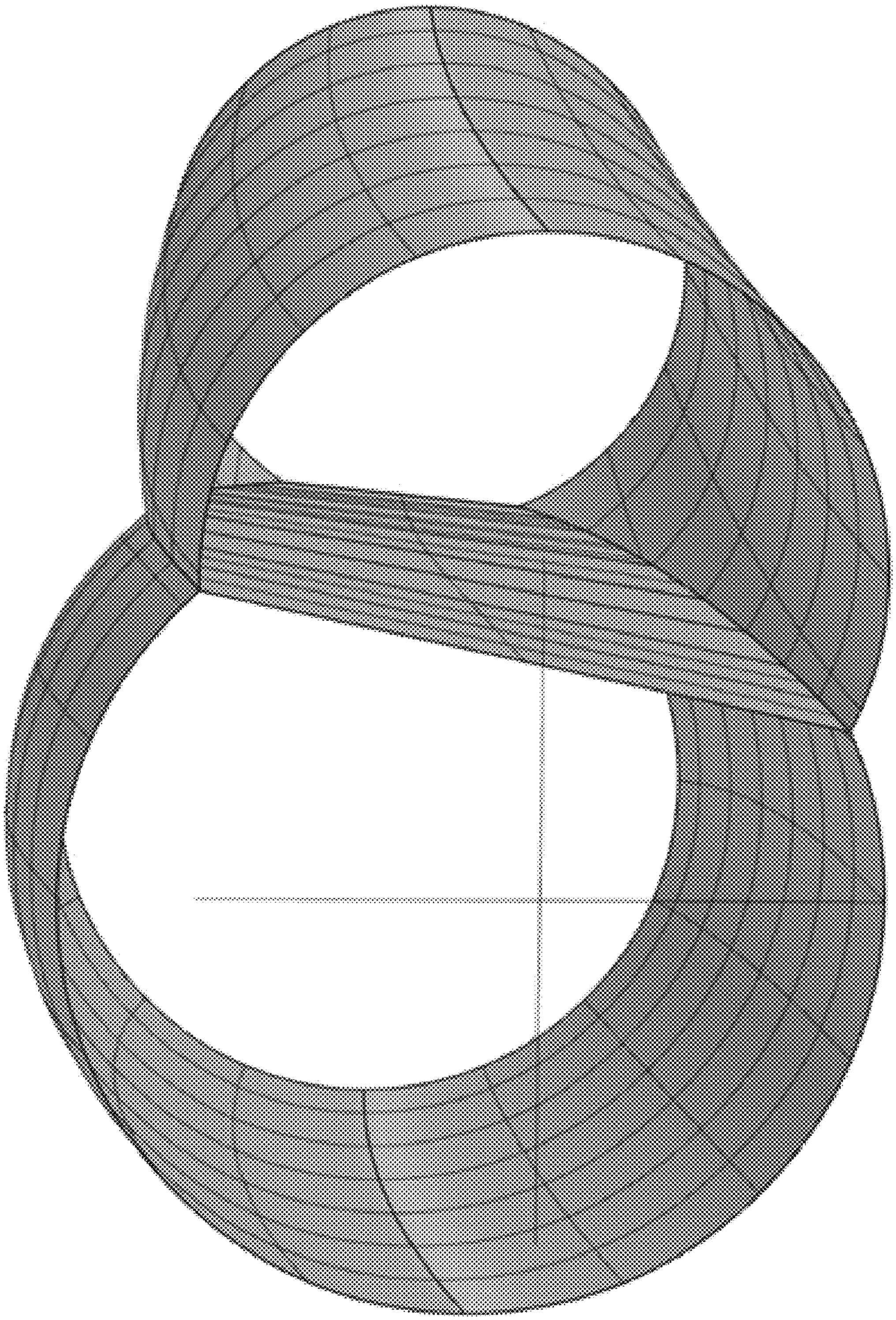
FIG. 3H illustrates a quarter front view of an exemplary embodiment of a double tank.

Now referring to FIG. 3H, a quarter front view of an exemplary embodiment of a double tank is shown. The double tank, as explained above, may have a curved septum separating the two compartments of tank.

Figure 3I:
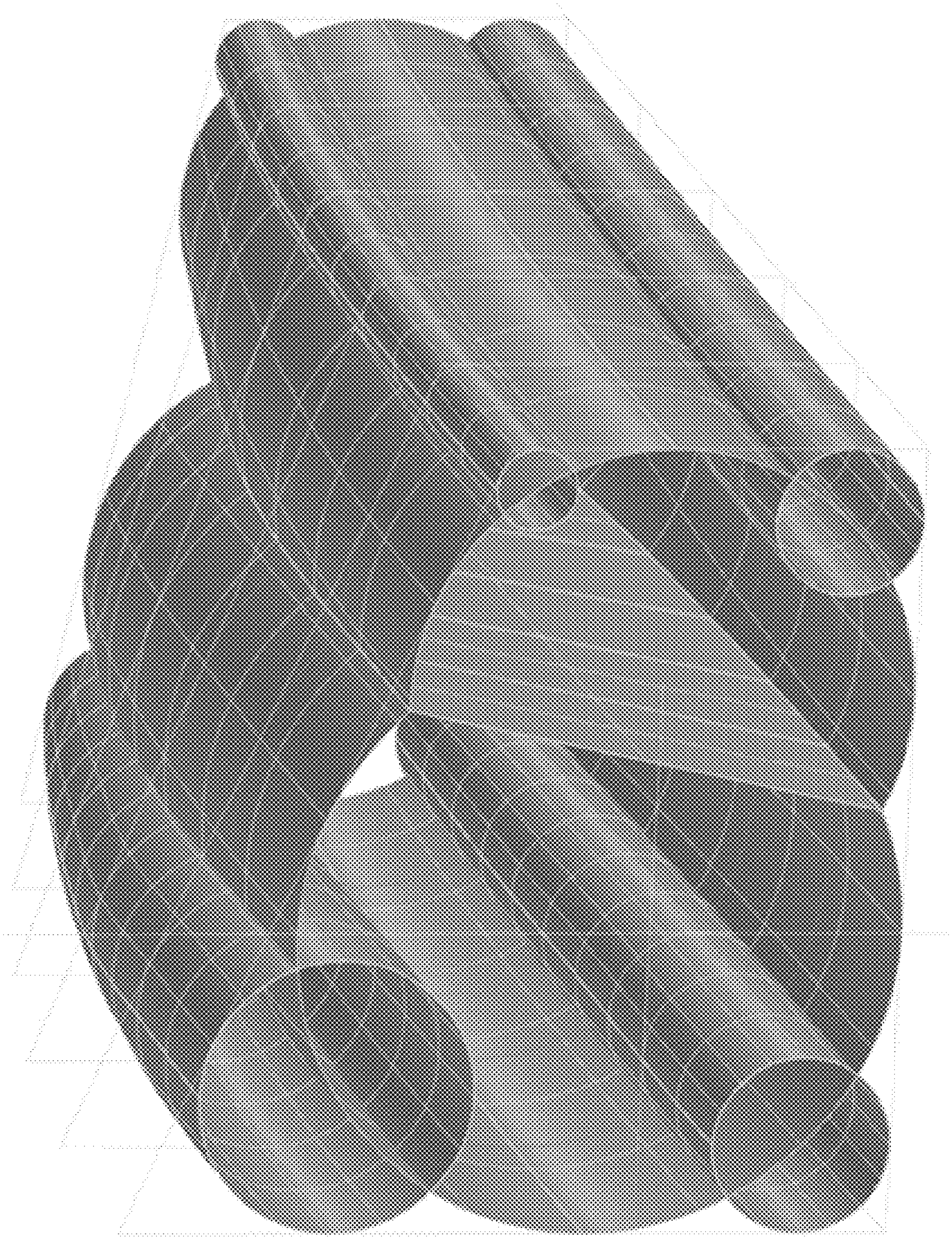
FIG. 3I illustrates a front quarter view of an exemplary embodiment of a multi-bubble tank without trimming.
Figure 3J:
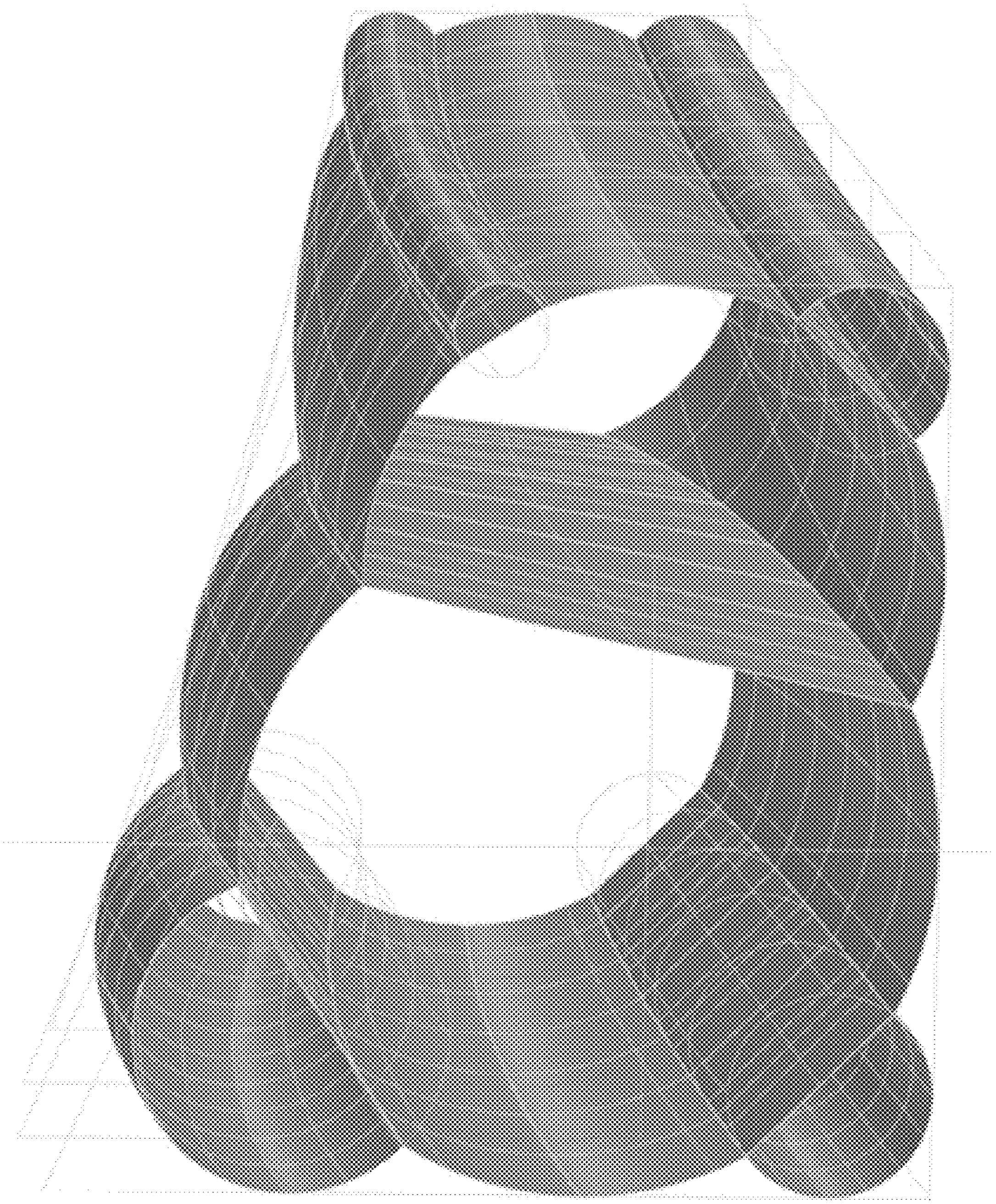
FIG. 3J illustrates a front quarter view of an exemplary embodiment of a multi-bubble tank trimmed with septa.

Now referring to FIGS. 3I and 3J, a front quarter view of an exemplary embodiment of a multi-bubble tank is illustrated in both figures. Given a rectangular compartment cross-section with a longitudinally oriented tank, this cross-section may be occupied by a single circular cross-section tank. Or, as noted above, a double tank may be used to provide greater cross-section area within the rectangular compartment. Additional bubbles may be added to fill in the four corners. A "multi-bubble tank" is a tank that has more than two compartments attached together. In some cases, two more bubbles may be added to fill in the valleys between the two main tanks. Multi-bubble tanks may have any number of compartments, but there may be a diminishing return on increasing complexity; either engineering judgment or actual engineering may be applied. In an embodiment, a muti-bubble tank may have four lobes added to fill in the corners of a notional envelope indicated by the lines in the figure. This provides a more valuable tank volume for a given compartment volume. Each compartment may have a circular cross section as shown, which may be trimmed to the large, main lobes. The main lobes may then be trimmed to small lobes. Each junction may be then faced with a septum. This "trimming" can be seen in FIG. 3J, wherein the tank is trimmed with septa. As used herein, "septa" are partitions between objects, such as two fuel tanks. The plurality of fuel tanks may be divided by septa such that there is a septum between each fuel tank. On the other hand, the multi-bubble tank in FIG. 3I does not have trimming. Tank may or may not have trimming.

With continued reference to FIGS. 3A-J, in some embodiments, fuel source 204 and/or at least a tank may be configured to connect with at least an upper skin and at least a lower skin of blended wing body 104 and/or aircraft 200. In a non-limiting example, fuel source 204 and/or tank may be configured to provide a structural support to at least an upper skin and at least a lower skin of aircraft 200 or BWB 104. Furthermore, upper and lower skins of BWB 104 may be structurally supported by one or more septa of at least a tank and/or fuel source 204. In this disclosure, the "upper and lower skins" of the BWB 104 refer to the upper and lower surfaces of an outer mold line of BWB 104. In some cases, center body of BWB 104 may be pressurized, relative ambient pressure which is typically below atmospheric (sea level) pressure at elevation. Therefore, in some cases, an upper skin and a lower skin may be forced away from one another by a resultant pressure differential. In some embodiments, additional structural support between walls of at least a tank (e.g., septa and/or tank walls) and upper and lower skins of BWB 104 may resist pressure. In some cases, use of at least a tank as a structural element of BWB 104 may reduce weight.

With continued reference to FIGS. 3A-J, fuel source 204 and/or tanks may be stored at least partially aft of cabin, near propulsors of aircraft 200, at least a wing portion of aircraft 200, or the like. As used herein, "cabin" is the portion of the aircraft that holds the crew, passengers, and cargo. Fuel source 204 and/or tanks may be stored at least partially aft of the cabin if at least a portion of the fuel tanks extends behind or "aft" of the rearmost portion of cabin. In an embodiment, because of the low density of liquified gas fuel, storing fuel tanks behind the cabin of aircraft 200 may not substantially affect the longitudinal center of gravity of the aircraft 200. In a multi-lobe tank configuration, each tank may not form a completely circular shape, such that the surface of tank may deform to achieve pure tension. Multi-lobe tank configuration may be beneficial as it provides more tank volume compared to a singular spherical tank. Multi-lobe tank configuration may be derived by adding tanks in the junctions between tanks. Fuel source 204 and/or tank, as discussed above, may provide structural support to aircraft 200 by acting as load bearing columns between the floor and ceiling of aircraft 200. In an embodiment, fuel source 204 and/or tank may be mounted within at least a portion of airframe. As used herein, an "airframe" provides structure to an aircraft. Airframe may be a part of the structural components of the aircraft 200. The plurality of fuel source 204 and/or tank may span across the full width of the aircraft 200. Because the ceiling of aircraft 200 may be downward sloping, each tank of the plurality of fuel tanks may vary in diameter and length. Fuel source 204 and/or tanks is vertically oriented within aircraft 200. For the purposes of this disclosure, "vertically oriented" within an aircraft refers to a position or alignment that is parallel to the yaw axis of an aircraft. As a non-limiting example, as shown in FIG. 3C, fuel source 204 and/or tanks may be vertically oriented so that a central axis 304 of fuel source 204 and/or tanks is parallel to the yaw axis of aircraft 200. In a non-limiting example, this may allow more space to be utilized within the transition portions of aircraft 200. Fuel source 204 and/or tanks may be stored vertically or horizontally. In an embodiment and as described above, fuel source 204 and/or tank may be a vertically oriented multi-lobe tank wherein its pressurized walls and its septa may extend from a lower outer mold line to an upper outer mold line of a tank. A top and bottom of tank may be closed out by spherical end caps inset from the outer mold line to provide room for the outer mold line skin's supporting structure. This may assist aircraft 200 in resisting pressurization and simultaneously carrying the shear stress that is otherwise carried by the ribs of the airframe of aircraft 200. Fuel source 204 and/or tanks may be stored in rows aft of cabin, within at least a wing of aircraft 200, or the like. In an embodiment, there may be two rows of fuel tanks. In doubling the rows, each fuel tank had a smaller tank wall radius, therefore each fuel tank wall is thinner and lighter. In some embodiments, fuel source 204 and/or tank may be vertically oriented and located within a transitional portion of blended wing body 104. In a non-limiting example, fuel source 204 and/or tank may be vertically oriented within a section of BWB 104 where fuselage gradually transitions into wings.

Continuing to reference FIGS. 3A-J, fuel source 204 and/or tank may include a longitudinal member. Longitudinal member may be a tension cable. A "tension cable," as used herein, is one or more ropes, wires, or the like that are in tension. Tension cables may be made of steel wires, or other metal wires. Tension cable may be wrapped in a sheath of plastic. Longitudinal member may be a bar, tube, chain, belt, or the like that translates movement from sector to another. In a non-limiting example, longitudinal member may run down the centerline of the aircraft, longitudinally. In another non-limiting example, longitudinal member and/or tension cable may run from top to bottom of fuel source 204 and/or tank. Longitudinal member may be a plurality of cables, such as a dual set of cables on opposite sides of the aircraft's centerline or fuel source 204 and/or tank. Longitudinal member may be driven by first linkage and/or second linkage such that movement from first linkage may be translated through longitudinal member and affect second linkage. Longitudinal member may be a continuous loop of cables that engage through first linkage and second linkage. Longitudinal member may be the "rope" that threads through the partial pulleys. Longitudinal member may be composed of materials such as KEVLAR, TECHNORA, VECTRAN, and/or SPECTRA. Longitudinal member may also be composed of metals such as steel, aluminum, titanium, or the like. Longitudinal member may accommodate differential thermal expansion between the cable and an airframe of the aircraft or fuel source 204 and/or tanks. The longitudinal member may be a tension cable that translates forces between a plurality of fuel source 204 and/or tanks.

Figure 4:
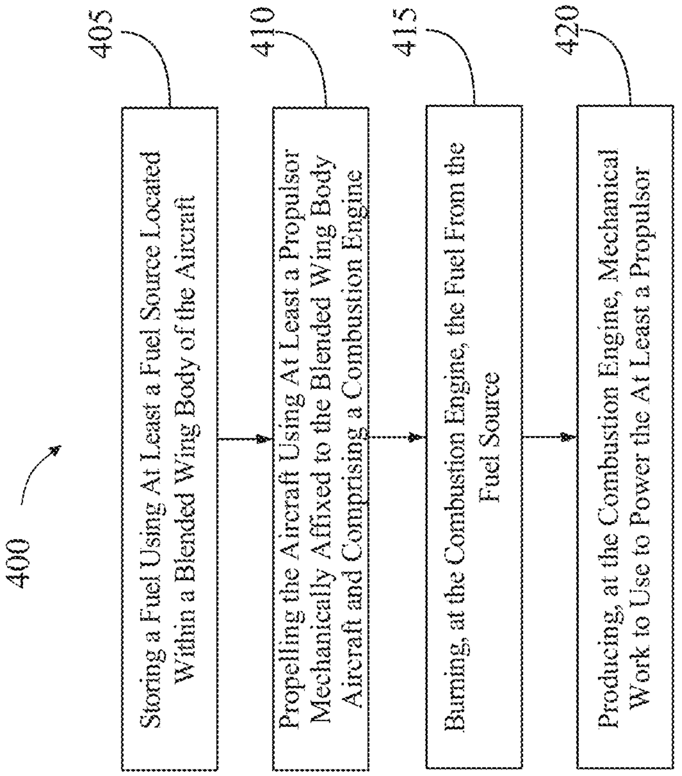
FIG. 4 illustrates a flow diagram of an exemplary method of use of a system for a blended wing body aircraft with a combustion engine.

Referring now to FIG. 4, an exemplary method 400 of use of a system for a blended wing body aircraft with a combustion engine. Blended wing body aircraft may be any of the blended wing body aircrafts described herein with reference to FIGS. 1 and 2. Combustion engine may be any of the combustion engines described herein with reference to FIG. 2.

Still referring to FIG. 4, at step 405, method 400 includes storing a fuel using at least a fuel source 204 located within a blended wing body 104 of the blended wing body aircraft. At least a fuel source 204 may comprise at least a fuel environment control mitigation. At least a fuel source 204 may be pressurized. Fuel may be any of the fuels described herein with reference to FIG. 1. At least a fuel source may be any of the fuel sources described herein with reference to FIG. 1. Blended wing body aircraft may be any of the blended wing body aircrafts described herein with reference to FIGS. 1 and 2.

Still referring to FIG. 4, at step 410, method 400 includes propelling the aircraft, using at least a propulsor 212 mechanically affixed to the blended wing body aircraft and comprising a combustion engine 216. Blended wing body aircraft may be any of the blended wing body aircrafts described herein with reference to FIGS. 1 and 2. At least a propulsor may be any of the propulsors described herein with reference to FIGS. 1 and 2. Combustion engine may be any of the combustion engines described herein with reference to FIG. 2.

Still referring to FIG. 4, at step 415, method 400 includes burning, at the combustion engine 216, the fuel from the fuel source 204. Combustion engine may be any of the combustion engines described herein with reference to FIG. 2. Fuel may be any of the fuels described herein with reference to FIG. 1. At least a fuel source may be any of the fuel sources described herein with reference to FIG. 1.

Still referring to FIG. 4, at step 420, method 400 includes producing, at the combustion engine 216, mechanical work to use to power the at least a propulsor 212. Combustion engine may be any of the combustion engines described herein with reference to FIG. 2. At least a propulsor may be any of the propulsors described herein with reference to FIGS. 1 and 2.

Still referring to FIG. 4, method 400 may include the use of a fuel cell 216. At least a fuel cell 216 may be powered by the fuel. At least a fuel cell 216 may be configured to power at least an electric motor. At least a fuel cell 216 may comprise an oxygen source. Still referring to FIG. 4, method 400 may include at least an auxiliary power unit 220 powered by the fuel and mechanically affixed to the aircraft. An auxiliary power unit 220 may be operatively connected with the at least a fuel cell 216 or may be the actual at least a fuel cell 216. At least a fuel cell 216 is configured to provide electrical power to aircraft systems. At least a fuel cell 216 starts the airplane and as an emergency backup in the event of an engine failure. At least a fuel cell 216 may also power the combustion engine.

Figure 5:
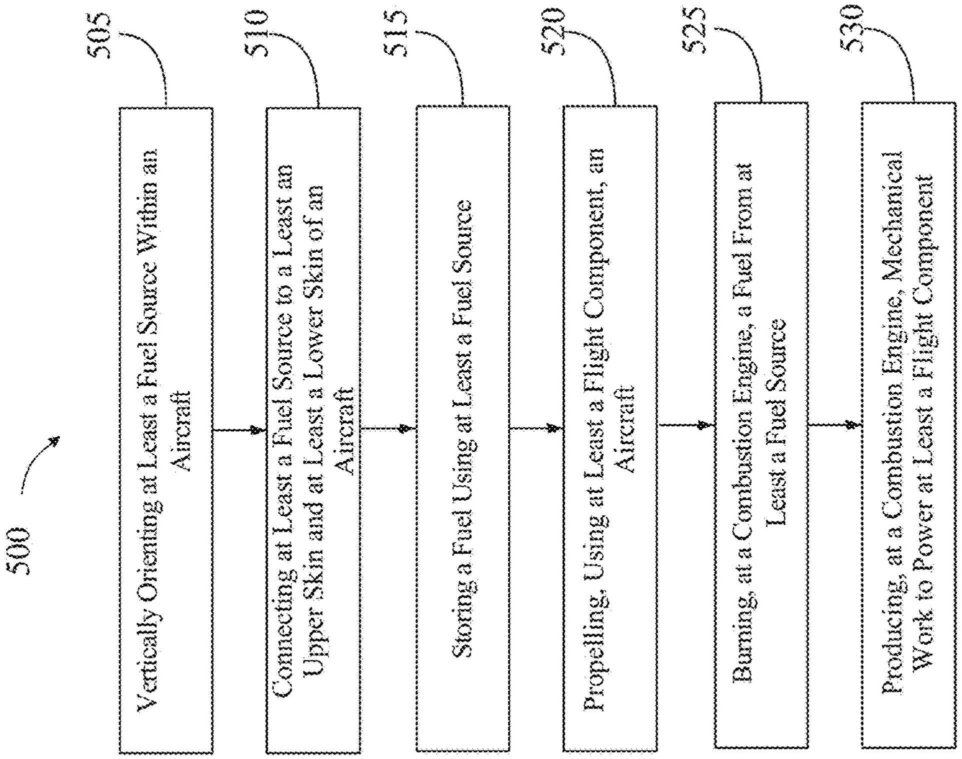
FIG. 5 illustrates a flow diagram of an exemplary method of use of a system for an aircraft with a combustion engine.

Referring now to FIG. 5, a flow diagram of an exemplary method 500 of use of a system for an aircraft with a combustion engine is illustrated. Method 500 includes a step 505 of vertically orienting at least a fuel source within an aircraft. In some embodiments, the aircraft may further include a blended wing body, wherein the blended wing body may include no striking demarcation between a main body of the aircraft and at least a wing of the aircraft. In some embodiments, the at least a fuel source may include at least a tank. In some embodiments, the at least a fuel source may be pressurized. In some embodiments, method 500 may further include locating the at least a fuel source vertically oriented within the aircraft in a transition region of the blended wing body of the aircraft. In some embodiments, the at least a fuel source may include a multi-bubble fuel tank. These may be implemented as disclosed with respect to FIGS. 1-4.

With continued reference to FIG. 5, method 500 includes a step 510 of connecting at least a fuel source to at least an upper skin and at least a lower skin of an aircraft. In some embodiments, method 500 may further include providing, using the at least a fuel source, structural support to the at least an upper skin and the at least a lower skin of the aircraft. In some embodiments, the at least a fuel source may further include a longitudinal member, wherein the longitudinal member may include a tension cable. These may be implemented as disclosed with respect to FIGS. 1-4.

With continued reference to FIG. 5, method 500 includes a step 515 of storing a fuel using at least a fuel source. This may be implemented as disclosed with respect to FIGS. 1-4.

With continued reference to FIG. 5, method 500 includes a step 520 of propelling, using at least a flight component, an aircraft. In some embodiments, the aircraft may further include at least an auxiliary power unit powered by the fuel of the at least a fuel source, wherein the at least an auxiliary power unit is mechanically affixed to the aircraft. These may be implemented as disclosed with respect to FIGS. 1-4.

With continued reference to FIG. 5, method 500 includes a step 525 of burning, at a combustion engine of at least a flight component, a fuel from at least a fuel source. In some embodiments, method 500 may further include starting, using at least a fuel cell powered by the fuel of the at least a fuel source, the combustion engine of the at least a flight component. These may be implemented as disclosed with respect to FIGS. 1-4.

With continued reference to FIG. 5, method 500 includes a step 530 of producing, at a combustion engine of at least a flight component, mechanical work to power at least a flight component. This may be implemented as disclosed with respect to FIGS. 1-4.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 6:
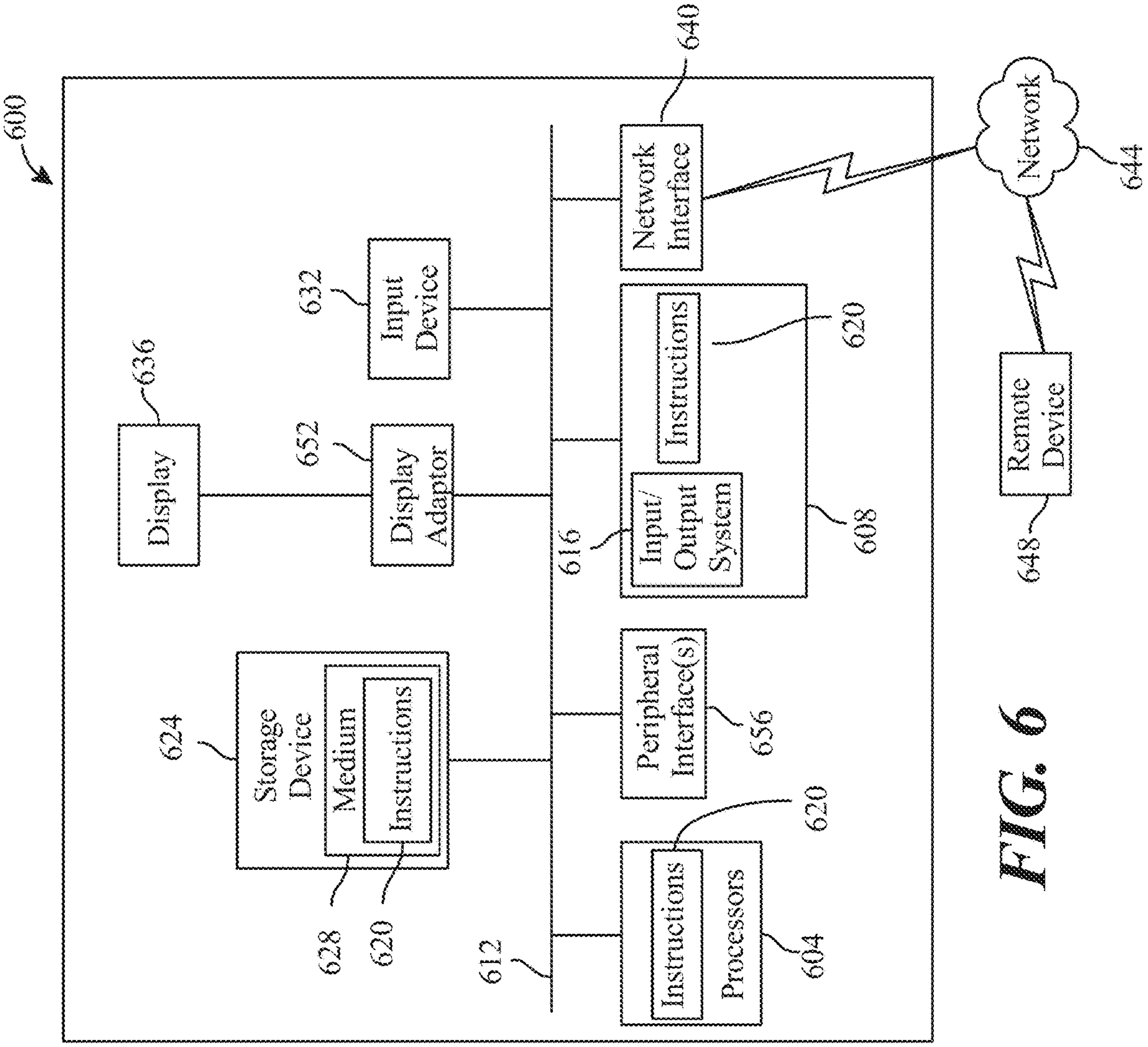
FIG. 6 illustrates a block diagram of a computing system that can be used to implement any one or more of the methodologies disclosed herein and any one or more portions thereof.

FIG. 6 shows a diagrammatic representation of one embodiment of a computing device in the exemplary form of a computer system 600 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 600 includes a processor 604 and a memory 608 that communicate with each other, and with other components, via a bus 612. Bus 612 may include any of several types of bus structures including, but not limited to, a memory bus, a memory controller, a peripheral bus, a local bus, and any combinations thereof, using any of a variety of bus architectures.

Processor 604 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 604 may be organized according to Von Neumann and/or Harvard architecture as a non-limiting example. Processor 604 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC).

Memory 608 may include various components (e.g., machine-readable media) including, but not limited to, a random-access memory component, a read only component, and any combinations thereof. In one example, a basic input/output system 616 (BIOS), including basic routines that help to transfer information between elements within computer system 600, such as during start-up, may be stored in memory 608. Memory 608 may also include (e.g., stored on one or more machine-readable media) instructions (e.g., software) 620 embodying any one or more of the aspects and/or methodologies of the present disclosure. In another example, memory 608 may further include any number of program modules including, but not limited to, an operating system, one or more application programs, other program modules, program data, and any combinations thereof.

Computer system 600 may also include a storage device 624. Examples of a storage device (e.g., storage device 624) include, but are not limited to, a hard disk drive, a magnetic disk drive, an optical disc drive in combination with an optical medium, a solid-state memory device, and any combinations thereof. Storage device 624 may be connected to bus 612 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 624 (or one or more components thereof) may be removably interfaced with computer system 600 (e.g., via an external port connector (not shown)). Particularly, storage device 624 and an associated machine-readable medium 628 may provide nonvolatile and/or volatile storage of machine-readable instructions, data structures, program modules, and/or other data for computer system 600. In one example, software 620 may reside, completely or partially, within machine-readable medium 628. In another example, software 620 may reside, completely or partially, within processor 604.

Computer system 600 may also include an input device 632. In one example, a user of computer system 600 may enter commands and/or other information into computer system 600 via input device 632. Examples of an input device 632 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 632 may be interfaced to bus 612 via any of a variety of interfaces (not shown) including, but not limited to, a serial interface, a parallel interface, a game port, a USB interface, a FIREWIRE interface, a direct interface to bus 612, and any combinations thereof. Input device 632 may include a touch screen interface that may be a part of or separate from display 636, discussed further below. Input device 632 may be utilized as a user selection device for selecting one or more graphical representations in a graphical interface as described above.

A user may also input commands and/or other information to computer system 600 via storage device 624 (e.g., a removable disk drive, a flash drive, etc.) and/or network interface device 640. A network interface device, such as network interface device 640, may be utilized for connecting computer system 600 to one or more of a variety of networks, such as network 644, and one or more remote devices 648 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 644, may employ a wired and/or a wireless mode of communication. In general, any network topology may be used. Information (e.g., data, software 620, etc.) may be communicated to and/or from computer system 600 via network interface device 640.

Computer system 600 may further include a video display adapter 652 for communicating a displayable image to a display device, such as display device 636. Examples of a display device include, but are not limited to, a liquid crystal display (LCD), a cathode ray tube (CRT), a plasma display, a light emitting diode (LED) display, and any combinations thereof. Display adapter 652 and display device 636 may be utilized in combination with processor 604 to provide graphical representations of aspects of the present disclosure. In addition to a display device, computer system 600 may include one or more other peripheral output devices including, but not limited to, an audio speaker, a printer, and any combinations thereof. Such peripheral output devices may be connected to bus 612 via a peripheral interface 656. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for an aircraft with a combustion engine, the aircraft omitting a tube-and-wing airframe and comprising:
- a main body gradually transitioning into a set of wings with carbon fiber semi-monocoque construction;
- at least a cylindrical fuel source vertically oriented within the aircraft and located within a transitional portion where the main body gradually transitions into the set of wings, wherein the cylindrical fuel source is configured to store a fuel, wherein:
  - the at least the cylindrical fuel source is configured to connect to at least an upper skin and at least a lower skin of the aircraft and act as load bearing columns within the aircraft; and
- at least a flight component configured to propel the aircraft, wherein the at least a flight component comprises the combustion engine, wherein the combustion engine is configured to:
  - burn the fuel from the at least the cylindrical fuel source; and
  - produce mechanical work to power the at least a flight component.

2. The system of claim 1, wherein the at least the cylindrical fuel source is further configured to provide structural support to the at least an upper skin and the at least a lower skin of the aircraft.

3. The system of claim 1, wherein the at least the cylindrical fuel source comprises a multi-bubble fuel tank.

4. The system of claim 1, further comprising:
- at least an auxiliary power unit powered by the fuel of the at least the cylindrical fuel source, wherein the at least an auxiliary power unit is mechanically affixed to the aircraft.

5. The system of claim 1, further comprising:
- at least a fuel cell powered by the fuel of the at least the cylindrical fuel source, wherein the at least a fuel cell is configured to start the combustion engine of the at least a flight component.

6. The system of claim 1, further comprising:
- a blended wing body, wherein the blended wing body comprises no striking demarcation between a main body of the aircraft and at least a wing of the aircraft.

7. The system of claim 6, wherein the at least the cylindrical fuel source vertically oriented within the aircraft is located in a transition region between a fuselage and wings of the blended wing body of the aircraft.

8. A method of use of a system for an aircraft with a combustion engine, the method comprising:
- vertically orienting at least a cylindrical fuel source within the aircraft;
- connecting the at least a cylindrical fuel source to at least an upper skin and at least a lower skin of the aircraft, wherein the at least the cylindrical fuel source acts as load bearing columns within the aircraft;
- storing a fuel using the at least the cylindrical fuel source, wherein the at least the cylindrical fuel source comprises a multi-bubble fuel tank comprising a plurality of lobes, and wherein each junction of the multi-bubble fuel tank comprises a continuous septum that partitions the multi-bubble fuel tank into a set of compartments comprising a first lobe compartment trimmed to a second main lobe;
- propelling, using at least a flight component, the aircraft;
- burning, at the combustion engine of the at least a flight component, the fuel from the at least the cylindrical fuel source; and
- producing, at the combustion engine of the at least a flight component, mechanical work to power the at least a flight component.

9. The method of claim 8, further comprising:
- providing, using the at least the cylindrical fuel source, structural support to the at least an upper skin and the at least a lower skin of the aircraft.

10. The method of claim 8, wherein the aircraft further comprises at least an auxiliary power unit powered by the fuel of the at least the cylindrical fuel source, wherein the at least an auxiliary power unit is mechanically affixed to the aircraft.

11. The method of claim 8, further comprising:
- starting, using at least a fuel cell powered by the fuel of the at least the cylindrical fuel source, the combustion engine of the at least a flight component.

12. The method of claim 8, wherein the aircraft further comprises a blended wing body, wherein the blended wing body comprises no striking demarcation between a main body of the aircraft and at least a wing of the aircraft.

13. The method of claim 12, further comprising: locating the at least the cylindrical fuel source vertically oriented within the aircraft in a transition region between a fuselage and wings of the blended wing body of the aircraft.

* * * * *